United States Patent
Adsumilli et al.

(10) Patent No.: US 10,045,120 B2
(45) Date of Patent: Aug. 7, 2018

(54) ASSOCIATING AUDIO WITH THREE-DIMENSIONAL OBJECTS IN VIDEOS

(71) Applicant: GoPro, Inc., San Mateo, CA (US)

(72) Inventors: Balineedu Chowdary Adsumilli, San Mateo, CA (US); Timothy Macmillan, La Honda, CA (US)

(73) Assignee: GoPro, Inc., San Mateo, CA (US)

( * ) Notice: Subject to any disclaimer, the term of this patent is extended or adjusted under 35 U.S.C. 154(b) by 85 days.

(21) Appl. No.: 15/187,695

(22) Filed: Jun. 20, 2016

(65) Prior Publication Data
US 2017/0366896 A1    Dec. 21, 2017

(51) Int. Cl.
*H04R 1/40* (2006.01)
*G01S 3/786* (2006.01)
*G11B 27/10* (2006.01)

(52) U.S. Cl.
CPC ............ *H04R 1/406* (2013.01); *G01S 3/7864* (2013.01); *G11B 27/10* (2013.01)

(58) Field of Classification Search
CPC ........ H04R 1/406; G01S 3/7864; G11B 27/10
USPC ....................................................... 386/239
See application file for complete search history.

(56) References Cited

U.S. PATENT DOCUMENTS

| | | | |
|---|---|---|---|
| 4,179,704 A | 12/1979 | Kaiser | |
| 6,504,569 B1 | 1/2003 | Jasinschi | |
| 6,611,607 B1 | 8/2003 | Davis | |
| 6,633,685 B1 | 10/2003 | Kusama | |
| 6,728,317 B1 | 4/2004 | Demos | |
| 6,996,244 B1 | 2/2006 | Slaney | |
| 7,222,356 B1 | 5/2007 | Yonezawa | |
| 7,483,618 B1 | 1/2009 | Edwards | |

(Continued)

FOREIGN PATENT DOCUMENTS

| JP | H09181966 A | 7/1997 |
|---|---|---|
| JP | 2005252459 A | 9/2005 |

(Continued)

OTHER PUBLICATIONS

PCT International Search Report and Written Opinion for PCT/US2015/023680, dated Oct. 6, 2015, 13 pages.

(Continued)

*Primary Examiner* — Thai Tran
*Assistant Examiner* — Nien-Ru Yang
(74) *Attorney, Agent, or Firm* — Sheppard Mullin Richter & Hampton LLP

(57) ABSTRACT

Disclosed is a system and method for generating a model of the geometric relationships between various audio sources recorded by a multi-camera system. The spatial audio scene module associates source signals, extracted from recorded audio, of audio sources to visual objects identified in videos recorded by one or more cameras. This association may be based on estimated positions of the audio sources based on relative signal gains and delays of the source signal received at each microphone. The estimated positions of audio sources are tracked indirectly by tracking the associated visual objects with computer vision. A virtual microphone module may receive a position for a virtual microphone and synthesize a signal corresponding to the virtual microphone position based on the estimated positions of the audio sources.

19 Claims, 8 Drawing Sheets

(56) References Cited

U.S. PATENT DOCUMENTS

| | | |
|---|---|---|
| 7,512,886 B1 | 3/2009 | Herberger |
| 7,750,904 B2 | 7/2010 | Jojic |
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,171,577 B1 | 10/2015 | Newman |
| 9,253,533 B1 | 2/2016 | Morgan |
| 9,342,376 B2 | 5/2016 | Jain |
| 9,396,385 B2 | 7/2016 | Bentley |
| 9,396,588 B1 | 7/2016 | Li |
| 9,418,283 B1 | 8/2016 | Natarajan |
| 9,547,908 B1 | 1/2017 | Kim |
| 9,575,803 B2 | 2/2017 | Chauvet |
| 2002/0165721 A1 | 11/2002 | Chang |
| 2003/0007567 A1 | 1/2003 | Newman |
| 2003/0147547 A1 | 8/2003 | Lin |
| 2004/0001706 A1 | 1/2004 | Jung |
| 2004/0017504 A1 | 1/2004 | Prandoni |
| 2004/0128317 A1 | 7/2004 | Sull |
| 2004/0131229 A1 | 7/2004 | Acharya |
| 2005/0025454 A1 | 2/2005 | Nakamura |
| 2005/0108031 A1 | 5/2005 | Grosvenor |
| 2005/0117805 A1 | 6/2005 | Poutet |
| 2005/0198018 A1 | 9/2005 | Shibata |
| 2006/0071825 A1 | 4/2006 | Demos |
| 2006/0080286 A1 | 4/2006 | Svendsen |
| 2006/0115108 A1 | 6/2006 | Rodriguez |
| 2006/0251289 A1 | 11/2006 | Williams |
| 2007/0204310 A1 | 8/2007 | Hua |
| 2007/0230461 A1 | 10/2007 | Singh |
| 2008/0019548 A1* | 1/2008 | Avendano ............... H04R 3/005 |
| | | 381/313 |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0170626 A1 | 7/2008 | Sung |
| 2008/0177706 A1 | 7/2008 | Yuen |
| 2008/0183843 A1 | 7/2008 | Gavin |
| 2008/0253735 A1 | 10/2008 | Kuspa |
| 2008/0270569 A1 | 10/2008 | McBride |
| 2008/0313541 A1 | 12/2008 | Shafton |
| 2009/0019995 A1 | 1/2009 | Miyajima |
| 2009/0125559 A1 | 5/2009 | Yoshino |
| 2009/0132371 A1 | 5/2009 | Strietzel |
| 2009/0153730 A1 | 6/2009 | Knee |
| 2009/0213270 A1 | 8/2009 | Ismert |
| 2009/0252474 A1 | 10/2009 | Nashida |
| 2009/0324191 A1 | 12/2009 | Reusens |
| 2010/0046842 A1 | 2/2010 | Conwell |
| 2010/0086216 A1 | 4/2010 | Lee |
| 2010/0104261 A1 | 4/2010 | Liu |
| 2010/0177977 A1 | 7/2010 | Seshadri |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0266157 A1 | 10/2010 | Shin |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0286625 A1 | 11/2011 | Petrovic |
| 2011/0293250 A1 | 12/2011 | Deever |
| 2012/0002112 A1 | 1/2012 | Huang |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0170805 A1 | 7/2012 | Brown |
| 2012/0210205 A1 | 8/2012 | Sherwood |
| 2012/0246114 A1 | 9/2012 | Edmiston |
| 2012/0281871 A1 | 11/2012 | Reed |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0314442 A1 | 11/2013 | Langlotz |
| 2013/0318443 A1 | 11/2013 | Bachman |
| 2013/0330019 A1 | 12/2013 | Kim |
| 2013/0343727 A1 | 12/2013 | Rav-Acha |
| 2014/0022394 A1 | 1/2014 | Bae |
| 2014/0050454 A1 | 2/2014 | Slotte |
| 2014/0063061 A1 | 3/2014 | Reitan |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0267801 A1 | 9/2014 | Grundmann |
| 2014/0282661 A1 | 9/2014 | Martin |
| 2014/0300644 A1 | 10/2014 | Gillard |
| 2014/0308024 A1* | 10/2014 | Antonellis ............ G10L 19/008 |
| | | 386/248 |
| 2014/0328570 A1 | 11/2014 | Cheng |
| 2014/0334796 A1 | 11/2014 | Galant |
| 2014/0341528 A1 | 11/2014 | Mahate |
| 2014/0341547 A1* | 11/2014 | Shenoy .................... H04N 5/91 |
| | | 386/285 |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |

(56) References Cited

U.S. PATENT DOCUMENTS

| | | |
|---|---|---|
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0371447 A1 | 12/2015 | Yasutake |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0057363 A1 | 2/2016 | Posa |
| 2016/0080830 A1 | 3/2016 | Kim |
| 2016/0094601 A1 | 3/2016 | Besehanic |
| 2016/0103830 A1 | 4/2016 | Cheong |
| 2016/0125633 A1 | 5/2016 | Windmark |
| 2016/0189752 A1 | 6/2016 | Galant |
| 2016/0205341 A1 | 7/2016 | Hollander |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0274338 A1 | 9/2016 | Davies |
| 2016/0286235 A1 | 9/2016 | Yamamoto |
| 2016/0292881 A1 | 10/2016 | Bose |
| 2016/0358603 A1 | 12/2016 | Azam |
| 2016/0358628 A1 | 12/2016 | Liu |
| 2016/0366330 A1 | 12/2016 | Boliek |
| 2016/0366396 A1 | 12/2016 | Kim |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Ernoult, Emeric, "How to Triple Your YouTube Video Views with Facebook", SocialMediaExaminer.com, Nov. 26, 2012, 16 pages.
PCT International Preliminary Report on Patentability for PCT/US2015/023680, dated Oct. 4, 2016, 10 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, dated Dec. 17, 2015, 7 Pages.
PCT International Search Report and Written Opinion for PCT/US15/12086 dated Mar. 17, 2016, 20 pages.
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.
Achanta R., et al., 'Slic Superpixeis Gompared to State-of-the-Art Superpixei Methods,' IEEE Transactions on Pattern Analysis and Machine intelligence, 2012, vol. 34 (11), pp. 2274-2282.
Adsumilli C, 'A dissertation submitted in partial satisfaction of the requirements for the degree of Doctor of Philosophy in Electrical and Computer Engineering', Sep. 2005, 193 pages.
Adsumilli C. et al., 'A Dynamically Adaptive Constrained Unequal Error Protection Scheme for Video Transmission over Wireless Channels', Proceedings IEEE International Workshop on Multimedia Signal Processing, 2002, pp. 41-44, Virgin Islands, USA.
Adsumilli C. et al., 'A Hybrid Constrained Unequal Error Protection and Data Hiding Scheme for Packet Video Transmission', Proceedings IEEE International Conference on Acoustics, Speech, and Signal Processing (ICASSP), Apr. 2003, pp. V680-V683, Hong Kong.
Adsumilli C. et al., A Noise Based Quantization Model for Restoring Block Transform Compressed Images:, Proceedings of the IASTED International Conference Signal and Image Processing, Aug. 13-16, 2001, pp. 354-359, Honolulu, Hawaii, USA.
Adsumilli C. et al., 'A Robust Error Concealment Technique Using Data Hiding for Image and Video Transmission Over Lossy Channels', IEEE Transactions on Circuits and Systems for Video Technology, Nov. 2005, pp. 1394-1406, vol. 15(11).
Adsumilli C. et al., 'Adapive Wireless Video Communications: Challenges and Approaches', Proceedings of International Workshop on Packet Video, Apr. 2002, pp. 1-11, Pittsburgh, Pennsylvania, USA.
Adsumilli C. et al., 'Detector Performance Analysis of Watermark-Based Error Concealment in Image Communications', Proceedings IEEE International Conference on Image Processing, 2005, pp. 916-919, vol. 3.
Adsumilli C. et al., 'Error Concealment in Video Communications by Informed Watermarking', PSIVT, 2006, pp. 1094-1102.
Adsumilli C. etal., 'Error Concealment in Video Communications Using DPCM Bit Stream Embedding', Proceedings IEEE International Conference on Acoustics, Speech and Signal Processing (ICASSP), Apr. 2005, pp. 11-169-11-172, Philadelphia, USA.
Allene C, et al,, 'Seamless Image-based Texture Atlases Using Multi-band Blending,' Pattern Recognition, 2008. ICPR 2008. 19th International Conference on, 2008.

(56) References Cited

OTHER PUBLICATIONS

Badrinarayanan V., et al., 'Segnet: a Deep Convoiutional Encoder-Decoder Architecture for Image Segmentation,' arXiv preprint arXiv: 1511.00561, 2015.
Baker, et al., "A Database and Evaluation Methodology for Optical Flow" International Journal of Computer Vision 92.1 (2011): 1-31.
Barghout L. and Sheynin J., 'Real-world scene perception and perceptual organization: Lessons from Computer Vision'. Journal of Vision, 2013, vol. 13 (9). (Abstract).
Barghout L., 'Visual Taxometric approach Image Segmentation using Fuzzy-Spatial Taxon Cut Yields Contextually Relevant Regions,' Communications in Computer and Information Science (CCIS), Springer-Verlag, 2014, pp. 163-173.
Bay H., et a!., 'Surf: Speeded up Robust Features,' European Conference on Computer Vision, Springer Berlin Heidelberg, 2006, pp. 404-417.
Beier et al., 'Feature-Based Image Metamorphosis,' in Computer Graphics Journal, Jul. 1992, vol. 28 (2), pp. 35-42.
Boucherkha, S., et al., 'A Lossless Watermarking Based Authentication System for Medical Images', Would Academy of Science, Engineering and Technology, International Journal of Medical, Health, Biomedical, Bioengineering and Pharmaceutical Engineering, 2007, vol. 1, No. 1, pp. 20-23.
Brainard R.C., et al., "Low-Resolution TV: Subjective Effects of Frame Repetition and Picture Replenishment," Bell Labs Technical Journal, Jan. 1967, vol. 46 (1), pp. 261-271.
Brox, et al., 'High Accuracy Optical Flow Estimation Based on a Theory for Warping', European Conference on Computer Vision, Springer-Verlag Berlin Heidelberg, 2004.
Burt et al., 'A Multiresolution Spline with Application to Image Mosaics,' in ACM Transactions on Graphics (TOG), 1983, vol. 2, No. 4, pp. 217-236.
Carli M. et al., 'Video Watermarking in 3D DCT Domain', Proceedings of International Workshop on Spectral Methods and Multirate Signal Processing, Jun. 2005, pp. 141-144, Riga, Lavia, (Invited Paper).
Cavallaro, et al., 'Object-based video: extraction tools, evaluation metrics and applications', Visual Communications and Image Processing; Jul. 8, 2003-Jul. 11, 2003, Lugano Switzerland, XP030080620.
Chan et al., 'Active contours without edges'. IEEE Transactions on Image Processing, 2001, 10 (2), pp. 266-277 (hereinafter 'Chan').
Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004.
Davis, et al., "The Visual Microphone: Passive Recovery of Sound from Video" (2014).
Didyk, et al., 'Joint View Expansion and Filtering for Automultiscopic 3D Displays', ACM Transactions on Graphics (TOG) 32.6 (2013): 221.
Elen, 'Whatever happened to Ambisonics' AudioMedia Magazine, Nov. 1991.
Fridrich, J., et al., 'Lossless Data Embedding-New Paradigm in Digital Watermarking', EURASIP Journal on Applied Signal Processing, Oct. 29, 2001, pp. 185-196.
Gracias, et al., 'Fast Image Blending Using Watersheds and Graph Cuts,' Image and Vision Computing, 2009, vol. 27 (5), pp. 597-607.
H.264 (Oct. 2012) and/or ISO/IEC 14496-10:2012, Information technology—Coding of audio-visual objects—Part 10: Advanced Video Coding.
High Efficiency Video Coding (HEVC), also known as H.265 (described in e.g., ITU-T Study Group 16—Video Coding Experts Group (VCEG)-ITU-T H.265, and/or ISO/IEC JTC 1/SC 29/WG 11 Motion Picture Experts Group (MPEG)—the HEVC standard ISO/IEC 23008-2:2015.
Herbst E., et al., 'Occlusion Reasoning for Temporal Interpolation Using Optical Flow,' Department of Computer Science and Engineering, University of Washington, Tech. Rep. UW-CSE-09-08-01,2009.

Huang Chun-Rong et al, 'Maximum a Posteriori Probability Estimation for Online Surveillance Video Synopsis', IEEE Transactions on Circuits and Systems for Video Technology, IEEE Service Center, Piscataway, NJ, US, vol. 24, No. 8, doi:10.1109/TCSVT.2014.2308603, ISSN 1051-8215, (Aug. 1, 2014), pp. 1417-1429, (Aug. 1, 2014), XP011555234.
Jakubowski M., et al, 'Block-based motion estimation algorithmsa survey,' Opto-Eiectronics Review 21, No. 1 (2013), pp. 88-102.
Kaur, M., et al., 'A Review on Digital Watermarkign Using LSB', International Journal of Advanced Research in Computer Science and Software Engineering, Nov. 2005, vol. 5, Issue 11, pp. 1210-1214.
Kendall A., et al., 'Bayesian Segnet: Model Uncertainty in Deep Convolutional Encoder-Decoder Architectures for Scene Understanding,' arXiv: 1511.02680, 2015.
Lowe D.G., 'Object Recognition From Local Scale-invariant Features,' Computer vision, The proceedings of the seventh IEEE international conference on 1999, vol. 2, pp. 1150-1157.
Mitzel D., et al., 'Video Super Resolution Using Duality Based TV-I1 Optical Flow,' Joint Pattern Recognition Symposium, 2009, pp. 432-441.
Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Lars Schnyder et al, 'Depth image based compositing for stereo 3D', 3DTV-Conference: The True Vision—Capture, Transmission and Display of 3D Video (3DTV-CON), 2012, IEEE, (Oct. 15, 2012), doi:10.1109/3DTV.2012.6365451, ISBN 978-1-4673-4904-8, pp. 1-4, XP032275894.
Schwartz, E., et al., "Implementation of Compression with Reversible Embedded Wavelets," In Proc. SPIE, 1995, 12 pages.
Shannon, 'A Mathematical Theory of Communication', Bell Syst. Tech. J., 27:379-423, 623-656, 1948.
Suzuki et al., 'Inter Frame Coding with Template Matching Averaging,' in IEEE international Conference on Image Processing Proceedings (2007), vol. (ill), pp. 409-412.
Szeliski, et al., "Fast Poisson blending using Multi-Splines." Computational Photography (ICCP), 2011 IEEE International Conference.
Szeliski R., "Computer Vision: Algorithms and Applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Tonci F. et al., 'Buffer Constraints for Rate-Distortion Optimization in Mobile Video Communications', Proceedings of International Symph on Signals, Circuits and Systems, Jul. 2005, pp. 71-74, Lasi, Romania (Invited Paper).
Vass, J., et al., 'Efficient Three-Dimensional Wavelet Codecs for Networked Video Communication,' in Proceedings of IEEE International Conference on Image Processing, Kobe, Japan, Oct. 1999, pp. 565-569.
Wadhwa, et al., "Phase-Based Video Motion Processing", ACM Transactions on Graphics (TOG) 32.4 (2013): 80.
Weinzaepfel, et al., "Deepflow: Large displacement optical flow with deep matching", Proceedings of the IEEE International Conference on Computer Vision, 2013.
Xiao, et al., 'Multiple View Semantic Segmentation for Street View Images,' 2009 IEEE 12th International Conference on Computer Vision, 2009, pp. 686-693.
Xiong Y et ai 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.

(56) References Cited

OTHER PUBLICATIONS

Zhang., "A Flexible New Technique for Camera Calibration" IEEE Transactions, dated Nov. 2000, vol. 22, No. 11, pp. 1330-1334.

* cited by examiner

ASSOCIATING AUDIO WITH THREE-DIMENSIONAL OBJECTS IN VIDEOS

BACKGROUND

Field of Art

The disclosure generally relates to the field of audio processing and in particular to tracking audio sources recorded by a multi-camera system and generating audio based on a geometric model of audio sources.

Description of Art

Location tracking of audio sources may be desirable in a number of applications such as automated audio/video editing and audio synthesis. However, conventional audio tracking techniques may be inaccurate. For example, echoes or noise may compromise tracking of the position of an audio source. Also, some audio sources may not constantly emit sound, and will be impossible to track while they are not emitting a sound. When an audio source starts to produce sound again from a different position, it may be difficult to determine if the audio source has moved or if it is a different audio source that is producing the sound. Furthermore, if the audio sources are directional microphones, an audio source may move outside the region in which one of the microphones is sensitive to sound, which may compromise the accuracy of the audio source tracking. Additionally, the audio may be subject to coloration and/or delays introduced by the directional characteristics of the microphones, which may make it difficult to precisely determine the location of each audio source.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1A illustrates an example system configuration diagram of directional microphones recording audio.

DETAILED DESCRIPTION

Figure 1A:
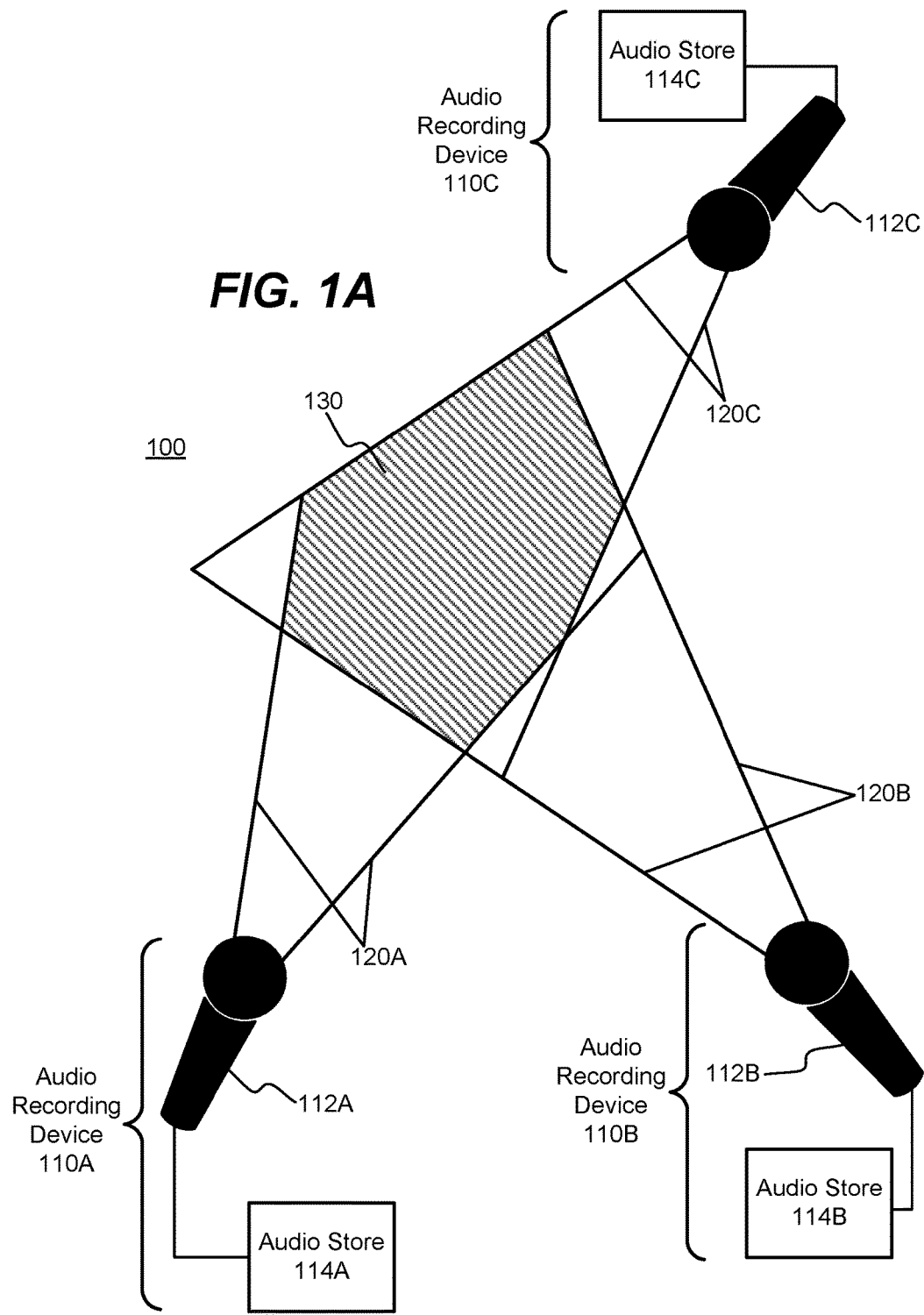
FIG. 1B illustrates an example system configuration diagram of directional microphones recording audio from two audio sources.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A set of videos and a set of recorded audio signals may be processed to identify one or more visual objects and one or more audio sources within a volume based on the visual content of the video and one or more source signals derived from the audio signals associated with the video. For example, if the audio signals and videos are recordings of a band playing a song, one of the identified source signals may correspond to the sound of a guitar being played and one of the identified visual objects may be the guitarist. The audio sources and the visual objects may be matched together, which may be based in part on estimated positions for each visual object and each audio source.

After the visual objects are matched to audio sources, the audio sources may be tracked indirectly by tracking the position of the corresponding visual objects. For example, a combination of visual object tracking and triangulation may be used to track each visual object. Thus, by tracking visual objects, the time-varying positions of audio sources may be estimated.

Based on these identified audio sources with calculated time-varying positions, a synthesized audio signal may be synthesized for a "virtual microphone" at an arbitrary virtual microphone position within the volume. The synthesized audio signal may simulate the sound that would have been recorded by an actual microphone if it was placed at that virtual microphone position during the original video and audio capture.

Configuration Overview

In a particular embodiment, a system and method may generate a model of the geometric relationships between various audio sources recorded by a multi-camera system. A spatial audio scene module may receive audio signals recorded by the multi-camera system. These audio signals may be separated into a set of source audio signals, each corresponding to an audio source. The audio source signals may be generated by blind source separation. Based on a comparison of the audio signals, the position of each audio source may be estimated. The spatial audio scene module may also perform object detection on the videos to identify and estimate the positions of one or more visual objects. Based on the respective estimated positions of the audio sources and the visual objects, the audio sources may be matched to visual objects.

The position of each audio source may subsequently be tracked by tracking, with computer vision, the visual object matched to the audio source. Accordingly, the spatial audio scene module may estimate a time-varying position for each of the audio sources by tracking the visual objects. The spatial audio scene module may output a spatial audio scene including the position of each source audio signals as a function of time.

A virtual microphone module receives a position for a virtual microphone and synthesizes a signal from the spatial audio scene that corresponds to the virtual microphone position. The synthesized signal may correspond to the expected sound at the virtual microphone position. For example, the virtual microphone module may compute a delay and a signal gain for each source audio signal of the spatial audio scene based on the positions of the audio sources and the position of the virtual microphone. The virtual microphone module may combine the source signals based on the computed delays and signal gains to generate the synthesized signal. The synthesized signal may be played in conjunction with a video generated from a volumetric video, thus creating the impression that a camera recorded video from that position.

Multi-Microphone System

Figure 1B:
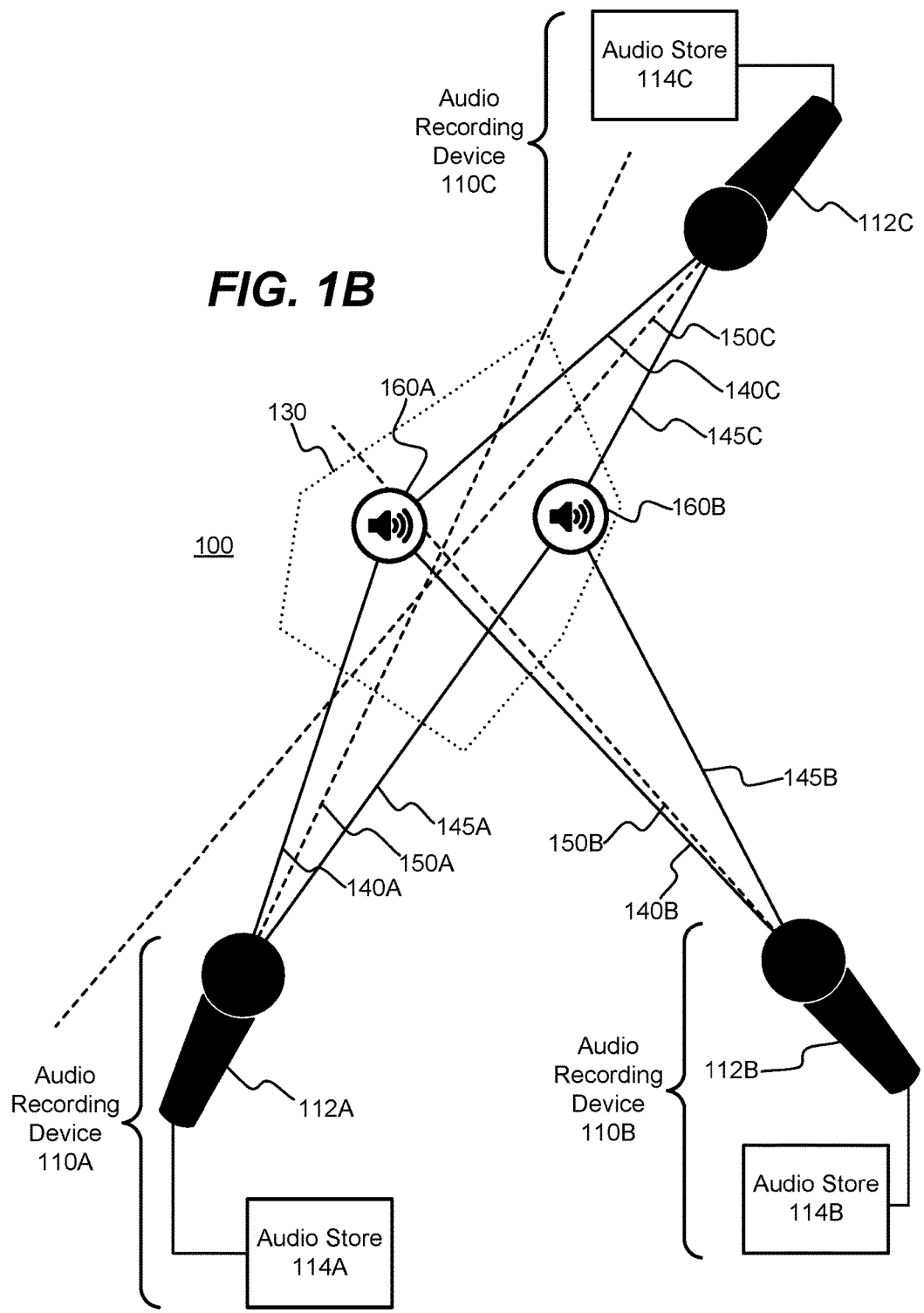

Spatial audio scenes may be generated based on audio recorded at a plurality of microphones. FIGS. 1A-1B illustrate an example system 100 of audio recording devices 110 (e.g., a first audio recording device 110A, a second audio recording device 110B, and a third audio recording device 110C) recording audio. The system configuration 100 depicted in FIG. 1A may include three audio recording devices 110A-110C that may each include a respective microphone 112 (e.g., a first microphone 112A, a second microphone 112B, and a third microphone 112C) and a respective audio store 114 (e.g., a first audio store 114A, a second audio store 114B, and a third audio store 114C). Each of the microphones 112 may be a directional microphone and may be associated with a respective main beam 120 (e.g., a first main beam 120A associated with the first microphone 112A, a second main beam 120B associated with the second microphone 112B, and a third main beam 120C associated with the third microphone 112C). In alternative systems, more than three audio recording devices 110 may be used. FIG. 1A also depicts a tracking region 130.

Each audio recording device 110 may be a camera or a part of a camera. Each audio recording device 110 converts sound to an electrical signal with a microphone 112. The electrical signal is converted into a digital signal and stored in a respective audio store 114.

The audio recording devices 110 may be able to automatically determine each other's relative positions. For example, the audio recording devices 110 may be communicatively coupled together. Each audio recording device 110 may detect the relative delays of radio signals transmitted by the other audio recording devices 110. These radio signals may be, for example, pseudonoise sequences, such as Gold codes, or packets that include time stamps. These radio signals also may be part of a hand-shake protocol between the audio recording devices 110. The hand-shaking protocol may be a low-bandwidth and/or low-power. The audio recording devices 110 may determine the distances between each other based on the time of flight delay of these radio signals and internal clocks in the audio recording devices 110 (e.g., clocks synchronized with a global navigation satellite system, such as the global positioning system (GPS), the global navigation satellite system (GLONASS), BeiDou-2, and/or Galileo). In some embodiments, the relative positions of the audio recording devices 110 are determined based on round trip delays of signal transmitted between the audio recording devices 110. In addition to or instead of radio signals, the relative positions and/or orientations of the audio recording devices 110 may be determined based on time of flight delay of audio signals (e.g., audio signals produced by an audio sources in the spatial audio scene), internal sensors (e.g., GPS sensors and/or magnetometers), and/or some combination thereof. In some embodiments, the audio recording devices 110 transmit ultrasound signals which are detected by the other audio recording devices 110 to determine the relative positions of the audio recording devices 110. Each audio recording devices 110 may also include one or magnetometers and/or one or more gyroscopes, with which it may estimate its relative orientation (e.g., a yaw, pitch, and roll). In some embodiments, the positions and/or orientations of each audio recording device 110 are pre-calibrated. These pre-calibrated positions and/or orientations may be stored in non-volatile memory on one or more of the audio recording devices 110.

Each of one or more of the audio recording device 110 may store metadata in association with the respective recorded audio signal. This metadata may specify the position and/or orientation of the audio recording device 110 or the other audio recording devices 110. The positions and/or orientations specified by the metadata may be relative and/or absolute. The In some embodiments, the metadata including information that is not position data, but can be used to recover the relative positions and/or orientations of the audio recording devices 110. For example, each of the audio recording devices 110 may store information indicating the distance between the audio recording device 110 and one or more of the other audio recording devices 110 and/or a signal propagation delay between the audio recording device 110 and one or more of the other audio recording devices 110. This metadata may be subsequently processed to estimate the relative locations and/or orientations of each of the audio recording devices. This processing may be performed by a server, a user device, and/or some other computing device. For example, the position of each audio recording device 110 may be determined by a device with a spatial audio scene module as discussed below in conjunction with FIG. 2. Alternately, each audio recording device 110 may have a position and/or orientation that are known a priori.

The microphones 112 may detect sounds from audio sources in a tracking region 130. The microphones 112 may be directional. In a directional microphone, the intensity of the electrical signal output by the microphone may be dependent on the angle of the audio source relative to the microphone. For example, a directional microphone may produce an electrical output signal for sounds originating from one angle, but produce almost no output signal for sounds of equal intensity originating from another angle. In alternate embodiments, the microphones 112 may be omni-directional (e.g., record all sounds on a plane equally well) or isotropic (e.g., record sounds from any angle equally well).

Each main beam 120 may include the range of angles at which the respective microphone 112 is most sensitive to sound (e.g., exceeding a sensitivity threshold). Alternately, each main beam 120 may include the range of angles having an acceptably low coloration for recorded sound. In some embodiments, the widths of the main beams 120 may dynamically vary as a function of frequency of the captured audio. The tracking region 130 may be defined as an area or volume where the main beams 120 of the microphones 112 overlap.

The audio stores 114 may include digital storage devices that each store the audio signal generated by a respective microphone 112. Each audio store 114 may be part of a larger non-volatile storage device. Each audio store 114 may include an analog-to-digital converter for converting the analog signal output by the respective microphone 112 into a digital signal. An audio store 114 may also process the analog signal output by the microphone (e.g., via a bandpass filter) and/or the digital signal (e.g., via compression) prior to storage.

In FIGS. 1A-1B, the tracking region 130 is the irregular hexagon representing the intersection of the main beams 120A-120C of all three microphones 112A-112C. In embodiments with more than three microphones 112, the tracking region 130 could be defined as the region in which a threshold number of the main beams intersect. This threshold may be based on the number of time-delayed versions of a source signal desirable to disambiguate the position of the audio source that produced the source signal that is not known a priori (e.g., the threshold may be 3 in 2-dimensional (2D) systems and 4 in 3-dimensional (3D) systems).

FIG. 1B illustrates the example multi-microphone system 100 configuration of FIG. 1A recording audio from a plurality of audio sources 160 (e.g., a first audio source 160A and a second audio source 160B). FIG. 1B illustrates the main beam axes 140 (e.g., a first main beam axis 140A corresponding to the first microphone 112A, a second main beam axis 140B corresponding to a second microphone 112B, and a third main beam axis 140C corresponding to the third microphone 112C). The main beam axes 140 may each include the center of its respective main beam 120 associated with a respective microphone 112. The main beam axis 140 of a microphone 112 may generally be (but not necessarily) the direction of the highest audio sensitivity of the microphone 112.

The audio sources 160 may produce sound which is detected by each of the directional microphones 112 and recorded by the audio recording devices 110. Each audio source 160 may be any object or entity which produces sound. For example, an audio source 160 might be a musician playing an instrument, a vehicle with a running motor, or a politician giving a speech. FIG. 1B depicts the displacement vectors 140 between the first audio source 160A and each of the microphones 112 representing the physical displacement between the first audio source 160A and the respective microphones 112. For example, in a three microphone system, a first displacement vector 140A represents a physical displacement between the first audio source 160A and the first microphone 112A, a second displacement vector 140B represents a physical displacement between the first audio source 160A and the second microphone 112B, a third displacement vector 140C represents a physical displacement between the first audio source 160A and the third microphone 112C. The displacement vectors 145 corresponding to the second audio source 160B are also shown representing the physical displacement between the second audio source 160B and the respective microphones 112. For example, in a three microphone system, a first displacement vector 145A represents a physical displacement between the second audio source 160B and the first microphone 112A, a second displacement vector 145B represents a physical displacement between the second audio source 160B and the second microphone 112B, a third displacement vector 140C represents a physical displacement between the second audio source 160B and the third microphone 112C. The audio sources 160 may be located in the tracking region 130. An audio source 160 that is outside of the tracking region 130 may not be recorded by every audio recording devices 110 or certain microphones 112 may not detect the audio with the threshold sensitivity (e.g., if the audio source 160 is outside of the main beam 120 of certain microphones 112).

Each audio source 160 in the tracking region 130 may be recorded by every microphone 112. The audio signals recorded by each microphone 112 may be approximated as containing a linear combination of time-delayed audio signals from each of the audio sources 160. Each of a set of K recorded audio signals $\{z_1(t), \ldots, z_K(t)\}$ (e.g., K=3 in the example system 100 having three audio recording devices 110) may be a combination of $N_a$ time-delayed signals, each corresponding to one of the $N_a$ audio sources 160 (i.e., $N_a$=2 in the example system 100). The time-delayed signal corresponding to the nth audio source 160 received at the ith microphone 112 (where i∈{1, ..., K}) may be based on a source signal $x_n(t)$ of the nth audio source 160, a time delay $\tau_{in}(t)$ of the nth source signal at the ith microphone 112, and a signal gain $\alpha_{in}(t)$ of the nth source signal at the ith microphone 112. In some embodiments, the signal gain $\alpha_{in}(t)$ and the time delay $\tau_{in}(t)$ are approximately constant (e.g., if the movement of the nth audio source 160 is relatively slow compared to the time period in which signals are analyzed). In some embodiments, the signal gain $\alpha_{in}(t)$ and the time delay $\tau_{in}(t)$ are assumed to be constant. Specifically, the time-delayed source signal $y_{in}(t)$ corresponding to the nth source signal received at the ith microphone 112 may be approximately equal to:

$$y_{in}(t) = \alpha_{in}(t) x_n(t + \tau_{in}(t))$$

The delay $\tau_{in}(t)$ of the nth source signal at the ith microphone 112 may be the time offset of the signal $x_n(t)$ received at the ith microphone 112. The delay $\tau_{in}(t)$ may be based on the distance between the microphone 112 and the nth audio source 160 as well as any delay produced by the microphone 112 itself. The delay $\tau_{in}(t)$ may be further based on the frequency of the nth source signal $x_n(t)$ if, for example, the ith microphone 112 introduces frequency-dependent delay.

The signal gain $\alpha_{in}(t)$ may be a multiplier that indicates the relative magnitude of each of the signal $x_n(t)$ received at the ith microphone. The signal gain $\alpha_{in}(t)$ may be based on the distance between the ith microphone 112 and the nth audio source 160 (e.g., based on attenuation and geometric inverse-square law dilution as a function of distance). That is, for the first audio source 160A (i.e., i=1), the signal gain $\alpha_{1n}(t)$ of the signal recorded at the nth audio recording device 110 may be based on the magnitude of the displacement vectors between the audio source 160A and the respective microphone 112. The signal gain $\alpha_{in}(t)$ may be further based on the directional gain of the microphone 112 which is based on the polar response pattern of the microphone 112 and the relative angle between the microphone 112 and the audio source 160. That is, the signal gain $\alpha_{11}(t)$ corresponding to the first audio source 160A at the first microphone 112A may be based on the direction of the displacement vector 140A relative to the direction of the beam axis 150A of the microphone 112A. In some embodiments, the signal gain $\alpha_{in}(t)$ may also be based on the frequency of the nth source signal $x_n(t)$ if, for example, the polar response pattern of the ith microphone 112 is frequency-dependent. In some embodiments, $x_n(t)$ may be replaced with $x_n(t,v)$ where v represents the relative velocity of the nth audio source 160 in relation to the microphone 112A-112C. $x_n(t,v)$ may account for the Doppler effect.

Each microphone 112 may receive a time-delayed signal from each audio source 160 in the tracking region 130. Therefore, the ith recorded audio signal $z_i(t)$ may be approximately represented as an aggregation of each of the time-delayed source signals $\{y_{i1}(t), \ldots, y_{iN}(t)\}$. More specifically, $z_i(t)$ may be approximated by:

$$z_i(t) = \sum_{n=1}^{N_a} \alpha_{in}(t) x_n(t + \tau_{in}(t))$$

In some embodiments, a different model may be used to represent the relationship between the sounds produced by the audio sources 160 and the signals recorded by the microphones 112. For example, the audio recorded by the microphones 112 may be modeled as a convolutional mixture of sounds from the audio sources 160.

FIGS. 1A-1B illustrate a two-dimensional (2D) system 100, wherein each of the microphones 112 and the audio sources 160 lie on the same plane. In a 2D system, the position of each microphone 112 and each audio source 160 may be expressed by a 2D vector and the orientation of each microphone may be represented with a scalar angle.

In some embodiments, the system 100 is a three-dimensional (3D) system. In a 3D system, the position of each microphone 112 and each audio source 160 may be represented by a 3D vector and the orientation of each microphone 112 may be represented with a 3D vector (e.g., a vector specifying a yaw, pitch, and roll of the microphone). In some embodiments, the orientation of each microphone 112 may be represented by a vector of lower dimensionality (e.g., a 2D vector representing the orientation for a microphone with a radially symmetric pattern). For simplicity, the example of a 2D system is used throughout this specification. However, the concepts described herein with respect to 2D systems may generally be expanded to use in 3D systems. The number of microphones 112 and audio sources 120 and the relative positioning and orientations thereof may vary from the system 100 shown in FIGS. 1A-1B.

Example Spatial Audio Scene Module

Figure 2:
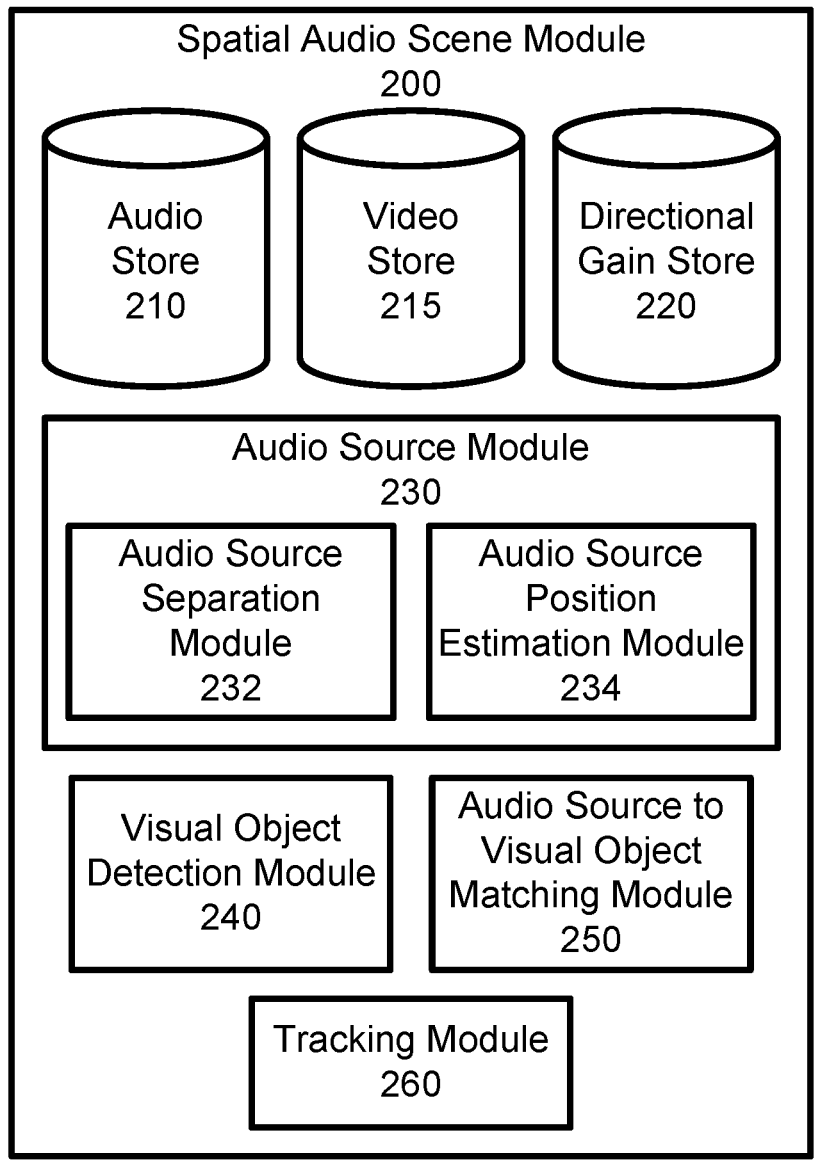
FIG. 2 illustrates a block diagram of an example spatial audio scene module.

FIG. 2 illustrates a block diagram of an example spatial audio scene module 200. The spatial audio scene module 200 may include an audio store 210, a video store 215, a directional gain store 220, an audio source module 230, a visual object detection module 240, an audio source to visual object matching module 250, and a tracking module 260. The audio source module 230 may include two sub-modules: an audio source separation module 232 and an audio position estimation module 234.

The audio store 210 may store one or more audio signals that were recorded simultaneously. The audio signals may be, for example, recordings of the same event from different positions and microphone orientations. For example, the audio signals may have been recorded by the audio recording devices 110 arranged as shown in FIGS. 1A-1B. Each stored audio signal of a set of K stored audio signals, $\{z_1(t), \ldots, z_K(t)\}$, may have been recorded by a distinct audio recording device 110. The audio signals may be stored with metadata tags indicating the position and orientation of its respective audio recording device 110. The position and orientation metadata may specify the position and orientation relative to one or more of the other audio recording devices 110 that recorded one of the audio signals or relative to some other reference point. Alternately, the position and orientation may be absolute positions and orientations. In some embodiments, metadata associated with the audio signals $\{z_1(t), \ldots, z_K(t)\}$ may specify the time of each audio signal (e.g., the time that the audio began recording and/or ended recording).

The video store 115 may store videos recorded by one or more cameras. In some embodiments, the audio recording devices 110 which recorded the audio signals $\{z_1(t), \ldots, z_K(t)\}$ stored in the audio store 220 are part of these cameras. In some embodiments, there are K videos and each video is associated with a respective audio signal $\{z_1(t), \ldots, z_K(t)\}$. The microphone of each audio recording device 110 that recorded an ith audio signal $z_i(t)$ (where $i \in \{1, \ldots, K\}$) may be an integrated microphone of a camera that recorded an associated video. In alternate embodiments, the number of videos and the number K of audio signals is different. For example, a single camera or a pair of cameras independent of the audio recording devices 110 and at a different position than the audio recording devices 110 may record a video. In some embodiments, the position of a camera (e.g., the position of the center of the camera's lens or the position of the camera's image sensor) and the position of the integrated microphone may be spatially separated. In alternate embodiments, one or more of the cameras may have multiple microphones. In alternate embodiments, the microphones that record the audio of a video may not be located in the same position as the camera for a video. In such an embodiment, information specifying each camera's position and orientation and each microphone's position and orientation may be received by the spatial audio scene module 200. This information may be stored as metadata associated with recorded videos. In some embodiments, some of the stored audio signals are received independently and do not have any associated video.

The directional gain store 220 may store information specifying audio characteristics of the audio recording devices 110 that recorded each audio signal $\{z_1(t), \ldots, z_K(t)\}$. The directional gain store 220 may store a model representing the directional gains of the microphone of each audio recording device 110 as a function of the direction of displacement from the sound source. For example, a microphone's directional gain may be represented as a function $g(\theta, \phi)$ where $\theta$ and $\phi$ are the yaw and pitch components of the displacement vector (e.g., 140) between the microphone 112 of the audio recording device 110 and an audio source 160. The directional gain may also be represented as a function of frequency (e.g., $g(\theta, \phi, f)$ where f is the frequency of audio recorded by a microphone). The directional gain store 220 may also store models of other audio characteristics of an audio recording device 110, such as a model characterizing non-linear response of the microphone of the audio recording device 110, the microphone's delay as a function of frequency, a model of noise recorded by the microphone, and/or a model of the audio signal processing (e.g., lossy compression) performed on the audio by the audio recording device 110. In some embodiments, the information stored in the directional gain store 220 is metadata associated with the audio signals $\{z_1(t), \ldots, z_K(t)\}$ stored in the audio store 110 and/or the videos stored in the video store 215 or is derived therefrom.

The audio source module 230 may access the K audio signals in the audio store 210 as input. The audio source module 230 may estimate the number of audio sources 160 based on the K audio signals. The estimated number of audio sources 160 is denoted herein as $\hat{N}_a$ (i.e., an estimate of $N_a$, the number of audio sources 160). The audio source module 230 also may estimate a position for each audio source 160. The estimated position of the nth audio source 160 is denoted herein as $\hat{p}_n$. The estimated position $\hat{p}_n$ may be a 2D or 3D vector, depending on whether the audio recording devices 110 that recorded the audio signals recorded in a 2D system (e.g., system 100) or 3D system. The set of estimated audio source positions $\{\hat{p}_1, \ldots, \hat{p}_{\hat{N}_a}\}$ may be absolute positions or relative positions (e.g., relative to an audio recording device 110 or another audio source 160).

In some embodiments, the audio source module 230 may operate on an audio source identification time period, which is a time period of the input audio signals that may be smaller than the durations of the audio signals. Outside of the audio source identification time period, the audio source module 230 may not estimate positions for audio sources 160. In some embodiments, the audio source module 230 also may not perform source separation or identify audio sources outside of this source identification time period. The audio source identification time period may be, for example, the first 5 seconds of audio for the videos in the video store 210. In some embodiments, the input audio signals each have different identification time periods.

Herein, the estimated audio source positions $\{\hat{p}_1, \ldots, \hat{p}_{\hat{N}_a}\}$ calculated by the audio source module 230 are described as time-invariant constants. The estimated audio source positions $\{\hat{p}_1, \ldots, \hat{p}_{\hat{N}_a}\}$ may correspond to a position of each audio source 160 at a single instant of time within the audio source identification time period or an average position during the audio source identification time period. Alternately, the instant of time may be before the time period, because of the propagation delay of sound. In alternate embodiments, the estimated audio source positions may be functions of time to more precisely account for movement of the sources during the audio source identification time period.

The audio source module 230 may include the audio source separation module 232, which performs source separation on the K audio signals $\{z_1(t), \ldots, z_K(t)\}$ in the audio store 210. Source separation may denote processing an audio signal or a set of audio signals to separate the signal or set of signals into a set of $\hat{N}_a$ source signals, each representing the sound produced by a distinct audio source 160. The source separation module 232 may separate the received set of input audio signals $\{z_1(t), \ldots, z_K(t)\}$ into a set of $\hat{N}_a$ estimated source signals $\{\hat{x}_1(t), \ldots, \hat{x}_{\hat{N}_a}(t)\}$ The source separation module 232 may also determine an estimated signal gain and estimated delay for each pair of input audio signal and source signal. For example, the source separation module 232 may determine an estimated signal gain $\hat{\alpha}_{in}$ and estimated delay $\hat{\tau}_{in}$ for the ith input audio signal and the nth source signal. The estimated signal gains and delays may correspond to the same instant of time as the estimated audio source positions $\{\hat{p}_1, \ldots, \hat{p}_{\hat{N}_a}\}$.

As an example, three audio signals in the audio store 210 may include recordings by different audio sources 110 from different positions of a single music show that included a trumpeter, a guitarist, and a drummer. The audio source separation module 232 may take the three audio signals as inputs and produces an output of three source signals corresponding to the trumpeter, the guitarist, and the drummer, respectively. Each source signal may be an estimate of the sound produced by the individual musician with the sound from the other musicians and background sound suppressed.

In some embodiments, the audio source separation module 232 may include a machine learning model for separating the audio signals. The machine learning model may be trained with audio training data that is cataloged and/or annotated based on the type of source. In some embodiments, the spatial audio scene module 200 may include an input interface for receiving annotations to audio from a user. The user annotated audio may be used as training data input to the machine learning model. The model may be applied by the audio source separation module 232 to identify the sources of audio components in the input audio signals $\{z_1(t), \ldots, z_K(t)\}$ and/or to separate the input audio.

In some embodiments, the model may separate the input audio signals $\{z_1(t), \ldots, z_K(t)\}$ using visual cues from the video data associated with the audio signals. For example, the training data of the model may associate a certain class of visual objects with particular sounds and/or forms of sounds. If an object of this class is identified in the video data, the audio source can be separated based on this correlation between the class of visual objects and audio.

In some embodiments, the audio source separation module 232 may receive source information about the audio sources 160 or the audio signals produced by the audio sources 160. For example, the audio source separation module 232 may receive source information about the number of expected source signals, the audio characteristics of the source signals, or the position of the audio sources 160. For one or more audio sources 160, the audio characteristics may identify, for example, the expected center frequency, an expected range of frequencies, an audio profile (e.g., an audio profile for a drum set), an expected average loudness or sound intensity, an expected maximum loudness or sound intensity, an expected time period during which sound is played, and/or an expected relative signal gain between two or more of the input audio signals. The audio characteristics of the source information may be selected by a user or automatically selected based on visual cues in videos associated with the audio signals (e.g., if a drum set is recognized in a video with a machine vision system, the audio source separation module 232 may use a source separation algorithm to specifically identify an audio signal corresponding to a drum set). The audio source separation module 232 may use the received source information to separate signals into estimated source signals. In some embodiments, the audio source separation module 232 separates the input signals input audio signals $\{z_1(t), \ldots, z_K(t)\}$ based on the received source information.

In alternate embodiments, the audio source separation module 232 may perform a blind source separation algorithm on the input signals. That is, source separation may be performed with little or no source information.

Audio source separation may be performed on each input signal individually to generate a set of separated signals for each input signal. The resultant sets of separated signals may be compared and combined to generate a single set of estimated source signals, each corresponding to an audio source 160. Alternately, the audio source separation module 232 may implement a source separation algorithm that derives the estimated source signals based on a comparison of the input audio signals. For example, the audio source separation module 232 may derive estimated source signals based on independent component analysis or factor analysis.

The audio source separation module 232 may also determine an estimated signal gain and estimated delay for the component of each input signal corresponding to each estimated source signal. That is, the audio source separation module 232 may determine an estimated signal gain $\hat{\alpha}_{in}$ and estimated delay $\hat{\tau}_{in}$ for the ith input audio signal and the nth source signal for all $i \in \{1, \ldots, K\}$ and all $n \in \{1, \ldots, \hat{N}_a\}$. These determinations may be based on comparisons between each estimated source signal to each input signal. For example, the audio source separation module 232 may determine the estimated signal gains and estimated delays for the estimated source signals to minimize an error metric between the input audio signals and the corresponding summation of the time-delayed estimated source signals. The error metric may be an absolute error, a mean square error, some other error metric, or some combination thereof. In some embodiments, the ith input audio signal $z_i(t)$ and/or the estimated source signals $\{\hat{x}_1(t), \ldots, \hat{x}_{\hat{N}_a}(t)\}$ may be filtered and/or smoothed prior to computing and minimizing the error metric. In some embodiments, the error metric may be computed for a time period (e.g., a time period that corresponds to around 2 seconds of audio). As an example, for the ith input audio signal, the estimated signal gains $\{\hat{\alpha}_{i1}, \ldots, \hat{\alpha}_{i\hat{N}_a}\}$ and estimated delays $\{\hat{\tau}_{i1}, \ldots, \hat{\tau}_{i\hat{N}_a}\}$ may be selected by the audio source separation module 232 to minimize the mean square error $E_i$ over a time period $T_1$ to $T_2$:

$$E_i = \int_{-T_1}^{T_2} \left( z_i(t) - \sum_{n=1}^{\hat{N}_a} \hat{\alpha}_{in} \hat{x}_n(t - \hat{\tau}_{in}) \right)^2 dt$$

The audio source module 230 also may include the audio source position estimation module 234, which estimates the positions $\{\hat{p}_1, \ldots, \hat{p}_{\hat{N}_a}\}$ of each of the identified audio sources 160 based on the estimated signal gains and delays of each of the estimated source signals and the positions of the microphones 112. Herein, $P_i$ denotes the position of the ith microphone that recorded the ith audio signal. $G_i(p)$ denotes the signal gain of the ith microphone for an audio source located at a position p. $G_i(p)$ may be based on the ith microphone's directional gain $g(\theta, \phi)$ stored in the directional gain store 220 where $\theta$ and $\phi$ are the angles between $P_i$ and p. $G_i(p)$ may be further based on attenuation and geometric inverse-square law dilution as a function of distance between the ith microphone's position $P_i$. For example, $G_i(p)$ may be approximated by:

$$G_i(p) = \frac{g_i(\theta, \phi)}{\|P_i - p\|^2} e^{-\beta \|P_i - p\|}$$

The operator $\|\cdot\|$ denotes the magnitude of a vector (i.e., $\|P_i - p\|$ is the distance between $P_i$ and p). $\beta$ is an attenuation constant for sound in the transmission medium (e.g., air). $\beta$ may be a function of frequency. e is a positive scalar (e.g., Euler's number).

The audio source position estimation module 234 may estimate the positions $\{\hat{p}_1, \ldots, \hat{p}_{\hat{N}}\}$ of the audio sources by solving the following system of equations:

for all $i \in \{1, \ldots, K\}, n \in \{1, \ldots, \hat{N}_a\}$ $\|\hat{p}_n - P_i\| = c\hat{\tau}_{in}$ $G_i(\hat{p}_n) = \hat{\alpha}_{in}$ where c is the speed of sound in the transmission medium (e.g., 243.2 m/s in dry air at 20° C.). Since the above system of equations is, in general, overdetermined and inconsistent, the estimated positions $\{\hat{p}_1, \ldots, \hat{p}_{\hat{N}_a}\}$ of the audio sources may be selected to be approximate solutions of the system. In finding an approximate solution to the above system of equations, the audio source position estimation module 234 may weigh the equations based on the estimated delay (e.g., $\|\hat{p}_n - P_i\| = c\hat{\tau}_{in}$) more heavily than those based on the signal gain (e.g., $G_i(\hat{p}_n) = \hat{\alpha}_{in}$).

Instead of or in addition to the error minimization method described above, the estimated positions $\{\hat{p}_1, \ldots, \hat{p}_{\hat{N}_a}\}$ of the audio sources may be determined by independent component analysis, beamforming, factorial hidden Markov models, spectral decomposition models (e.g., singular value decomposition), other source separation methods, or some combination thereof. Similarly, the set of estimated signal gains $\{\hat{\alpha}_{i1}, \ldots, \hat{\alpha}_{i\hat{N}_a}\}$, the estimated signal delays $\{\hat{\tau}_{i1}, \ldots, \hat{\tau}_{i\hat{N}_a}\}$, and/or the estimated source signal $\{\hat{x}_1(t), \ldots, \hat{x}_{\hat{N}_a}(t)\}$ may be calculated with any suitable source separation method.

The visual object detection module 240 may parse the visual channel of the one or more videos stored in the video store 215 to identify one or more visual objects in the videos through computer vision. The number of visual objects identified in the videos is denoted herein as $\hat{N}_v$. The visual object detection module 240 may recognize visual objects in the videos using an object classifier (e.g., a facial recognition system, a classifier configured to recognize people, or a generic classifier trained to recognize generic sound producing objects). The visual object detection module 240 may be restricted to detecting visual objects within the tracking region 130.

Detecting visual objects in the one or more videos may include detecting generic objects (e.g., a blue object, a foreground object, an object of a certain shape, and/or an object with a particular texture) from one or more frames in the videos. Detecting generic objects may include image segmentation. Generic objects may be detected based on color boundaries, textures, histograms, line detectors, and/or some other visual feature. Subsequent to detecting the generic objects, the visual object detection module 240 may classify objects with an object classification algorithm (e.g., that classifies visual objects corresponding to people, trees, bikes, cars, and/or some other type of object). Certain classes of objects may be filtered from the set of detected visual objects. For example, classified visual objects that are not expected to produce sound (e.g., a chair or a tree) may be removed from the set of visual objects. In some embodiments, the visual object detection module 240 also may perform object recognition on the classified visual objects. For example, a visual object classified as a person may be recognized as a particular person via a facial recognition algorithm (e.g., via a Viola-Jones algorithm). The visual objects detected by the visual object detection module 240 may be generic objects, identified objects, recognized objects, and/or some combination thereof. In some embodiments, the visual object detection module 240 utilizes a convolutional neural network and/or some other deep learning model.

The visual object detection module 240 may determine a position for each visual object. For example, in a three-dimensional environment, the visual object detection module 240 may triangulate the positions of one or more visual objects based on parallax between two or more of the videos in which the visual objects appear. In some embodiments, the visual object detection module 240 may determine the position of a visual object based on depth maps corresponding to each of the cameras that captured the visual object. In some embodiments, the estimation of the visual object's position may be based on a combination of parallax and depth maps. In some embodiments, the change in position of each visual object may be tracked with a mean-shift and/or continuously adaptive mean shift (CAMshift) algorithm. Herein, the estimated positions of the $\hat{N}_v$ visual objects are denoted as $$\{(\hat{P}_{vo})_1, \ldots, (\hat{P}_{vo})_{\hat{N}_v}\}.$$

In some embodiments, the visual object detection module 240 may operate on a visual object identification time period of the visual channel (e.g., a set of video frames) that is smaller than the durations of the videos. In some embodiments, the visual object detection module 240 may not identify new visual objects outside of this time period, other than those already being tracked. The visual object identification time period may correspond to the audio source identification of the time period of the audio source separation module 230. For example, the audio source identification time period and the visual object identification time period may overlap or be the same time period. In some embodiments, the audio source identification time period may be larger than or begins before the visual object identification time period to compensate for the propagation delay of the sounds recorded by the microphones.

Herein, the estimated visual object positions $$\{(\hat{P}_{vo})_1, \ldots, (\hat{P}_{vo})_{\hat{N}_v}\}$$

estimated by the visual object detection module 240 are described as constant positions. In some embodiments, the estimated visual object positions $$\{(\hat{P}_{vo})_1, \ldots, (\hat{P}_{vo})_{\hat{N}_v}\}$$

may correspond to a single instant of time. This instant of time may be within the visual object identification time period. In some embodiments, the instant of time that the estimated visual object positions $$\{(\hat{P}_{vo})_1, \ldots, (\hat{P}_{vo})_{\hat{N}_v}\}$$

correspond to may be the same instant of time to which the estimated audio source positions $$\{(\hat{P}_{vo})_1, \ldots, (\hat{P}_{vo})_{\hat{N}_v}\}$$

calculated by the audio source module 230 correspond. In alternate embodiments, the estimated visual object positions $$\{(\hat{P}_{vo})_1, \ldots, (\hat{P}_{vo})_{\hat{N}_v}\}$$

determined by the visual object detection module 240 may be functions of time. In some embodiments, the estimated position of visual object may be a range of positions, rather than a single point. For example, if the visual object is only identified in a single video, the estimated position of the visual object may be a line that intersects the focal point of the camera and the visual object and thus may lack depth information.

In some embodiments, the audio source module 230 and the visual object detection module 240 may operate independently. In alternate embodiments, the audio source module 230 and the visual object detection module 240 may share information and operate iteratively to identify the respective audio sources 160 and visual objects. For example, in one embodiment, the visual object detection module 240 may receive the number $\hat{N}_a$ of audio sources 160 identified by the audio source module 230. Responsive to receiving the number $\hat{N}_a$ of audio sources 160, the visual object detection module 240 may seek to identify the same number $\hat{N}_a$ of visual objects that most likely correspond to the audio sources 160. The visual object detection module 240 may also receive the estimated positions $\{\hat{p}_1, \ldots, \hat{p}_{\hat{N}_a}\}$ of the audio sources 160 identified by the audio source module 230. The visual object detection module 240 may specifically identify visual objects at or near the received estimates of the audio source positions $\{\hat{p}_1, \ldots, \hat{p}_{\hat{N}_a}\}$.

In additional alternate embodiments, the audio source module 230 may receive the number $\hat{N}_v$ of identified visual objects identified in the videos by the visual object detection module 240. Responsive to receiving the number $N_v$ of visual objects, the audio source module 230 may identify the same number $\hat{N}_v$ of audio sources 160. The audio source module 230 may also receive the estimated positions $$\{(\hat{P}_{vo})_1, \ldots, (\hat{P}_{vo})_{\hat{N}_v}\}$$

of the visual objects identified by the visual object detection module 240. The visual object detection module 240 may specifically identify audio sources 160 having signal gains or delays based on these received visual object positions $$\{(\hat{P}_{vo})_1, \ldots, (\hat{P}_{vo})_{\hat{N}_v}\}.$$

For example, if the nth identified visual object has an estimated position of $(\hat{P}_{vo})_n$, the audio source module 230 may search for an audio source 160 with a delay at an ith microphone approximately equal to $\tau_i = \|P_i - (\hat{P}_{vo})_n\|/c$.

The audio source to visual object matching module 250 may correlate the audio sources 160 identified by the audio source module 230 with the visual objects identified by the visual object detection module 240. The audio source to visual object matching module 250 may determine which audio sources 160 corresponds to each visual object. Throughout this description, the audio source to visual object matching module 250 is described as matching individual visual objects to one or more audio sources 160. However, in alternate embodiments, the audio source to visual object matching module 250 may match multiple visual objects to a single audio source 160. In another alternate embodiment, the audio source to visual object matching module 250 may match a set of one or more audio sources 160 to a set of one or more visual objects. The audio sources 160 and the visual objects may be matched based on their respective positions. For example, each audio source 160 may be matched with the visual object closest to it. In other embodiments, other features may be used instead of or in combination with position to match the audio sources 160 and visual objects. For example, if a face is detected as a visual object, and multiple audio sources are in the vicinity, the audio source to visual object matching module 250 may match the face to an audio source producing audio in a frequency range corresponding to a human voice.

The audio source to visual object matching module 250 may generate an audio-visual object which includes a visual object matched to one or more audio sources 160. Each audio-visual object may have an estimated position. The estimated position of an audio-visual object may be the estimated position of its visual object, the estimated position of one of its audio sources 160, or a weighted average of the visual object's position and the positions of the one or more audio sources 160 associated with the visual object.

The tracking module 260 may track each of the audio-visual objects as they move in the videos. The tracking module 260 may track each audio-visual object by tracking the position of the corresponding visual object and/or the position of one or more corresponding audio sources 160. The tracking module 260 may track the movement of the visual object of an audio-visual object. For example, the tracking module 260 may implement a video tracking algorithm to track the visual object in the one or more videos. Through triangulation, the tracking module 260 estimates the time-varying position of the visual object. In addition or alternately, the tracking module 260 may track the movement of a subset or all of the one or more audio sources 160 associated with each audio-visual object. In some embodiments, the tracking module 260 may use the audio source module 230 to estimate a time-varying position for these audio sources 160.

In some embodiments, the tracking module 260 tracks visual objects in the videos based on low level methods, such as mean-shift or CAMshift algorithms. The tracking module 260 may also track the positions of visual objects with high-frequency feature tracking, Gaussian mixture models (GMM), (random sample consensus) RANSAC, some other tracking method, and/or some combination thereof. In some embodiments, tracking may be performed with a combination of a low level tracking method (e.g., CAMshift) and a higher level tracking method (e.g., feature detection).

The tracking module 260 may track the position of the audio-visual object as a function of time. The time-varying position of the audio-visual object may be, for example, the tracked position of the audio-visual object's visual object, the tracked position of one its audio sources 160, a weighted average of the tracked positions of its audio sources 160, or a weighted average of the tracked position of its visual object and the tracked positions of its audio sources 160.

The type of tracking employed by the tracking module 260 may be conditional. For example, the tracking module 260 may track the audio-visual object by tracking its visual object when the visual object can be tracked accurately. However, in frames where the visual object cannot be tracked accurately, the tracking module 260 may switch to tracking the one or more audio sources 160 of the audio-visual object. The tracking module may determine that the visual object cannot be tracked accurately in frames where, for example, the visual object is obscured by another object, the lighting conditions are poor, or the visual object is outside of the frame of one or more of the videos.

The tracking module 260 may generate a time-varying position for the audio-visual objects corresponding to a tracking time period of the videos. The tracking time period may include a range of time that is not in the time periods that the audio source module 230 and the visual object detection module 240 used to determine the positions of audio sources and visual objects. In this way, the time-varying position of an audio-visual may be tracked in a time period other than the audio source identification time period and the visual object identification time period.

For example, the audio source module 230 may detect one or more audio sources and determine a position for each audio source during a period of time corresponding to the first 3 seconds of a video. The signals of the detected audio sources may correspond to, e.g., a snare drum sound, a ride cymbal sound, a soprano voice, and a guitar sound. The visual object detection module 240 may detect one or more visual objects and a location for each visual object in videos. The visual object detection module 240 may detect the visual objects in frames of videos corresponding to a time period that overlaps with the first 3 seconds of the video. The detected visual objects may correspond to, e.g., a drummer, a singer, and a guitarist. The audio source to visual object matching module 250 may match the audio sources to visual objects. For example, the snare drum and ride cymbal sounds may be matched to a drummer, the soprano voice may be matched to the singer, and the guitar sound may be matched to the guitarist. The tracking module 260 may track these audio-visual objects during a time period after the first 3 seconds of the video.

In some embodiments, the spatial audio scene module 200 may re-identify audio visual objects after the initial identification. That is, the spatial audio scene module 200 may identify and estimate positions for audio sources 160 and visual objects and match the audio sources 160 with visual objects more than once. Re-identifying audio visual objects may be performed periodically (e.g., every 120 second of video time). Alternately or additionally, re-identifying audio visual objects may be triggered, for example, when the motion of the audio-visual objects has characteristics under which a loss of tracking may be expected, when a new audio source 160 is identified, when a new audio source 160 enters the tracking region 130, when the location of a tracked visual object is lost, and/or when the tracked positions of an audio source 160 and the associated visual object diverges.

The set of audio source signals and their associated time-varying positions may compose a spatial audio scene. The spatial audio scene module 200 may generate a spatial audio scene for a set of video recordings of the same event. The spatial audio scene module 200 may provide the spatial audio scene to other modules or devices to allow them to synthesize audio from the spatial audio scene.

In some embodiments, the spatial audio scene module 200 and/or the submodules thereof are software modules. Each of these modules and/or submodules may include a set of instructions encoded according to a computer-readable syntax embodied on a non-transitory machine-readable medium. The instructions may be executed by one or more computer processors. Alternately, the spatial audio scene module 200 and/or the submodules thereof may be implemented as hardware modules, firmware modules, or a combination of software, hardware, and firmware.

Figure 3:
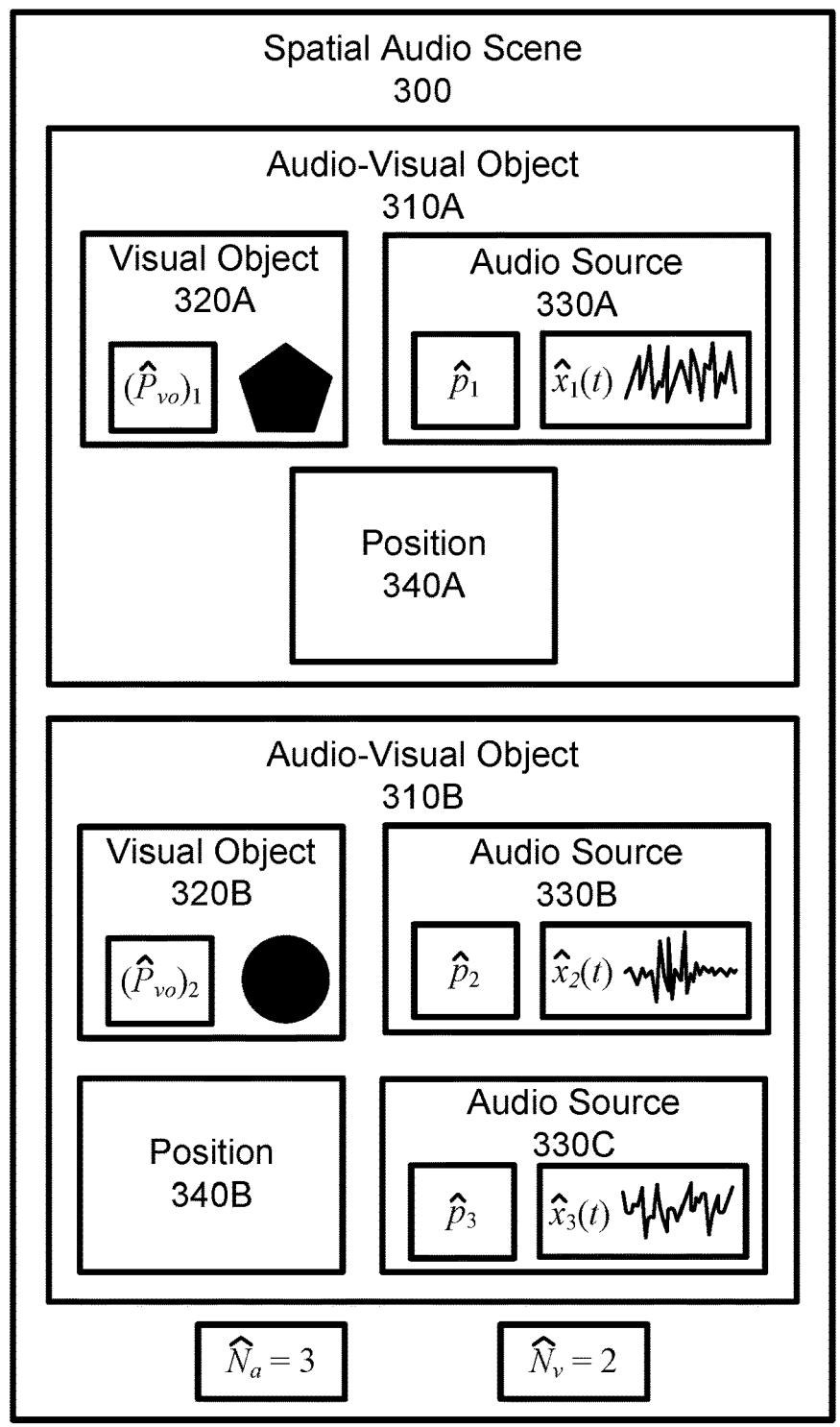
FIG. 3 illustrates a block diagram of an example data structure for an example spatial audio scene.

FIG. 3 illustrates a block diagram of an example data structure for an example spatial audio scene 300. The spatial audio scene 300 may be generated by the spatial audio scene module 200. The spatial audio scene 300 includes a plurality of audio-visual objects (e.g., a first audio-visual object 310A and a second audio-visual object 310B). Each of the audio-visual objects 310 includes a respective visual object 320 (e.g., a first visual object 320A corresponding to the first audio-visual object 310A and a second visual object 320B corresponding to the second audio-visual object 310B) and a respective position 340 (e.g., a first position 340A corresponding to the first audio-visual object 310A and a second position 340B corresponding to the second audio-visual object 310B). In the illustrated example, the estimated number $\hat{N}_v$ of visual objects 320 is 2. In this example, the first audio-visual object 340A includes one audio source 330A and the second audio-visual object 340B includes two audio sources 330B-330C. Thus, in this example, the estimated number $\hat{N}_a$ of audio sources 330 is 3.

The jth visual object 320 (for $j \in \{1, \ldots, \hat{N}_v\}$), may be associated with a respective estimated position $(\hat{P}_{vo})_j$. Thus, in the example in FIG. 3, the first and second visual objects 320A-320B are associated with respective estimated positions $(\hat{P}_{vo})_1$ and $(\hat{P}_{vo})_2$. Similarly, the nth audio source 330 (for $n \in \{1, \ldots, \hat{N}_a\}$), may be associated with a respective estimated position $\hat{p}_n$ and a respective estimated source signal $\hat{x}_n(t)$. Thus, in the example depicted in FIG. 3, the first, second, and third audio sources 320A-320C each have a respective position $\hat{p}_1$, $\hat{p}_2$, and $\hat{p}_3$ and a respective audio source signal $\hat{x}_1(t)$, $\hat{x}_2(t)$, and $\hat{x}_3(t)$. Each of the audio sources 330 may have been matched to a corresponding visual object 320 with a similar position by the audio source to visual object matching module 250. The position 340 of each audio-visual object 310 may be a time-varying position estimate calculated by the tracking module 340.

Figure 4:
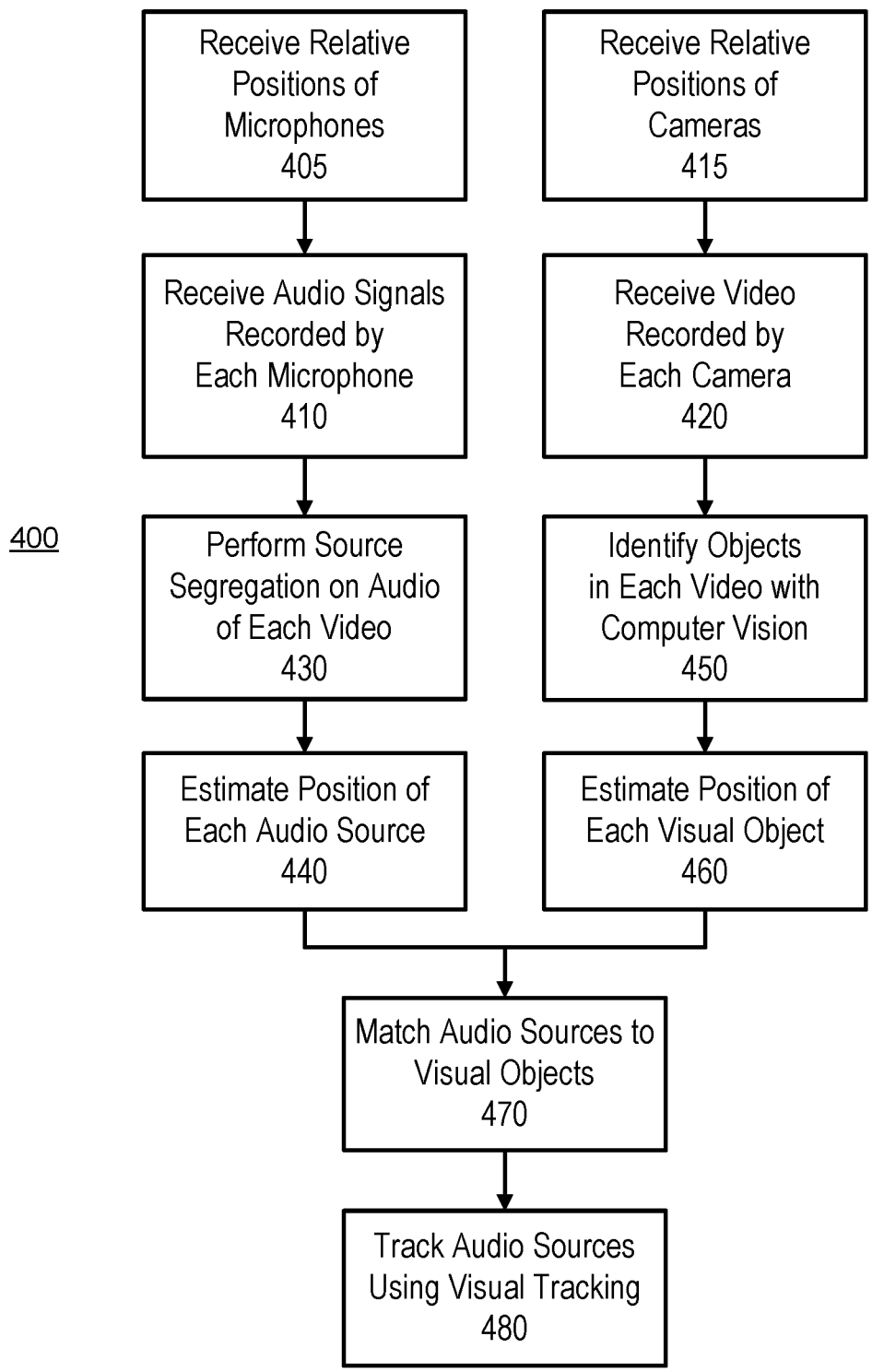
FIG. 4 illustrates a flowchart of a process for identifying and subsequently tracking audio sources.

FIG. 4 illustrates a flowchart of a process 400 that may be performed by the spatial audio scene module 200 for identifying and subsequently tracking audio sources 160. The spatial audio scene module 200 may receive 450 a relative position for each of a set of K microphones and receives 410 audio signals $\{z_1(t), \ldots, z_K(t)\}$ recorded by each of the set of microphones. The spatial audio scene module 200 may receive 415 the relative positions of a set of cameras and receives 420 a video recorded by each camera. The spatial audio scene module 200 may also receive orientations for each of the cameras. The videos, audio signals, microphone positions, and/or camera positions may be received together. For example, each video may include an audio signal and may include a metadata tag specifying the position and orientation of the camera.

The audio source separation module 232 may perform 430 source separation on the audio signals. The audio source separation module 232 may output a set of estimated source signals $\{\hat{x}_1(t), \ldots, \hat{x}_{\hat{N}_a}(t)\}$ which may be used by the audio source position estimation module 234 to estimate 440 the positions of each audio source.

The visual object detection module 240 may identify 450 visual objects in each video with computer vision. The visual object detection module 240 may also estimate 460 the position of each visual object. After positions are estimated 460 for each visual object and estimated 440 for each audio source, the audio source to visual object matching module 250 may match 470 the audio sources to the visual objects. The audio source to visual object matching module 250 may output audio-visual objects, each including a visual object and the one or more audio sources matched to them.

The tracking module 260 then may track each audio-visual objects by tracking the visual object of the audio-visual object. The tracking module 260 may track 480 the positions of the audio sources 160 of each audio-visual object by tracking its visual object using an object tracking algorithm. The tracking module 260 may generate a spatial audio scene that includes the audio from each audio source in the set of received videos.

Example Virtual Microphone Module

Figure 5:
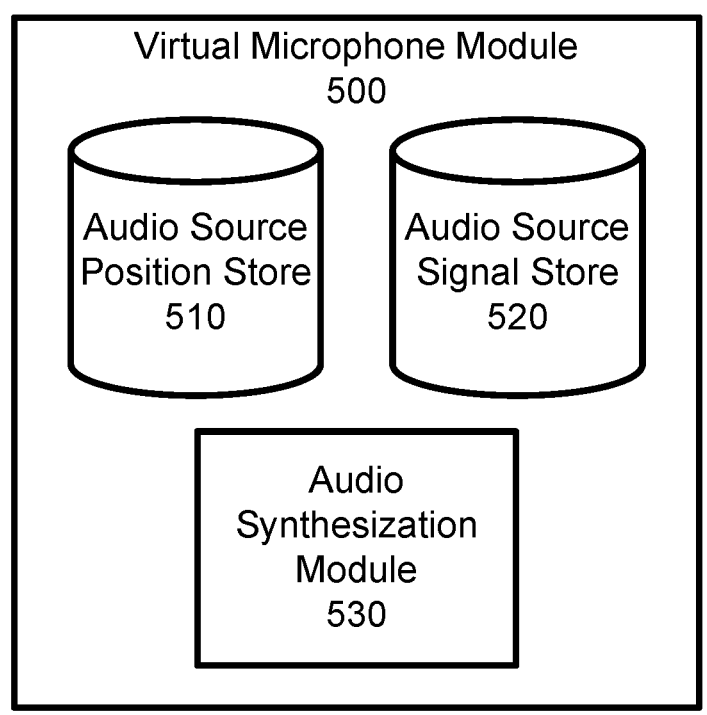
FIG. 5 illustrates a block diagram of an example virtual microphone module.

FIG. 5 illustrates a block diagram of an example virtual microphone module 500. The virtual microphone module may receive a spatial audio scene (e.g., spatial audio scene 300) generated by the spatial audio scene module 200. The virtual microphone module 500 may include an audio source position store 510, an audio source signal store 520, and an audio synthesization module 530.

The audio source position store 510 may store the estimated position of one or more audio sources. The estimated position may be the time-varying position determined by the tracking module 260 of the spatial audio scene module 200. The audio source signal store 520 may store the estimated audio source signals (e.g., $\{\hat{x}_1(t), \ldots, \hat{x}_{\hat{N}_a}(t)\}$) of audio sources. The audio source signals may have been estimated by the source separation module 232 of the spatial audio scene module 200. Each audio source signal may be stored in association with an estimated position in the audio source position store 510. The audio source position store 510 and the audio source signal store 520 may store a set of audio sources signals and audio source positions as part of a spatial audio scene.

The audio synthesization module 530 may generate a synthesized audio signal based on a spatial audio scene. The audio synthesization module 530 may receive a desired microphone position of a virtual microphone within a volume and synthesize an audio signal based on spatial audio scene and the virtual microphone position. The synthesized audio signal may simulate the sound that would have been captured by a microphone if it was present at the desired microphone position during recording of the spatial audio scene. For example, the audio synthesization module 530 may calculate a delay and signal gain for each audio source signal in the spatial audio scene based on the respective positions associated with the audio source signal and the desired microphone position of the virtual microphone. The audio source signals may be modified based on the calculated delays and signal gains and combined together to generate the synthesized audio signal. In some embodiments, the audio sources may be modeled as isotropic sources of sound. In alternate embodiments, the audio sources may be modeled as directional sources.

In some embodiments, the virtual microphone may be simulated as an isotropic microphone. That is, the virtual microphone may simulate uniform directional gain from all angles. In alternate embodiments, the virtual microphone may simulate the directional gain of a microphone with a directional polar pattern. For example, the virtual microphone may have the polar pattern of an omnidirectional, bi-directional, subcardioid, cardioid, hypercardioid, supercardioid, or shotgun microphone. The polar pattern of the virtual microphone may be selected by a user. In some embodiments, the audio synthesization module 530 may generate stereophonic sound signals or a multichannel sound signal for use with a surround sound system.

In some embodiments, the spatial audio scene module 200 and the virtual microphone module 500 may be part of the same computing system. For example, these modules may be part of a user device such as a personal computer, a media display device, a gaming console, or a virtual reality headset. Alternately, the spatial audio scene module 200 may be located on a different computing device than the virtual microphone module 500. The device with the virtual microphone module 500 may receive the spatial audio scene through a computer network (e.g., the Internet). For example, the virtual microphone module 500 may be located on a user device, which downloads a volumetric video and a corresponding spatial audio scene. A user may select a position to place a "virtual camera" and the volumetric video may be processed and displayed to a user from that position. The virtual microphone module 500 may synthesize a stereophonic audio signal from two virtual microphone located at the position as the virtual camera.

In alternate embodiments, the virtual microphone module 500 operates with a set of videos from a multi-camera system that do not compose a volumetric video. The virtual microphone may be placed at the position of a camera that is part of the multi-camera system. This may be useful, for example, when the camera does not include an integrated microphone, when the camera includes a low quality microphone, or when the sound captured by the camera is mixed to unwanted noise. Furthermore, a virtual microphone may be placed at a location from which no camera recorded video.

In some embodiments, the spatial audio scene may be edited prior to generating a synthesized audio signal for a virtual microphone. For example, a list of the audio sources in a spatial audio scene may be displayed to a user. The user may be provided with an option to listen to the isolated signal of the estimated audio source signal associated with the audio source. The user may select an option to remove or amplify one or more audio sources in the spatial audio scene. The user may also be provided with an option to adjust the noise level from audio recorded by one of the microphones 112 that does not correspond to an identified audio source 160.

The user may also be provided with an option to move a position of an audio source 160 within a volume corresponding to the spatial audio scene. The user may be provided with an option to set or alter a time-varying path for an audio source 160.

The spatial audio scene module 500 and/or the submodules thereof may be software modules. Each of these modules may include a set of instructions encoded according to a computer-readable syntax embodied on a non-transitory machine-readable medium. The instructions may be executed by one or more computer processors. Alternately, the spatial audio scene module 500 and/or the submodules thereof may be implemented as hardware modules, firmware modules, or a combination of hardware, firmware, and software modules.

Figure 6:
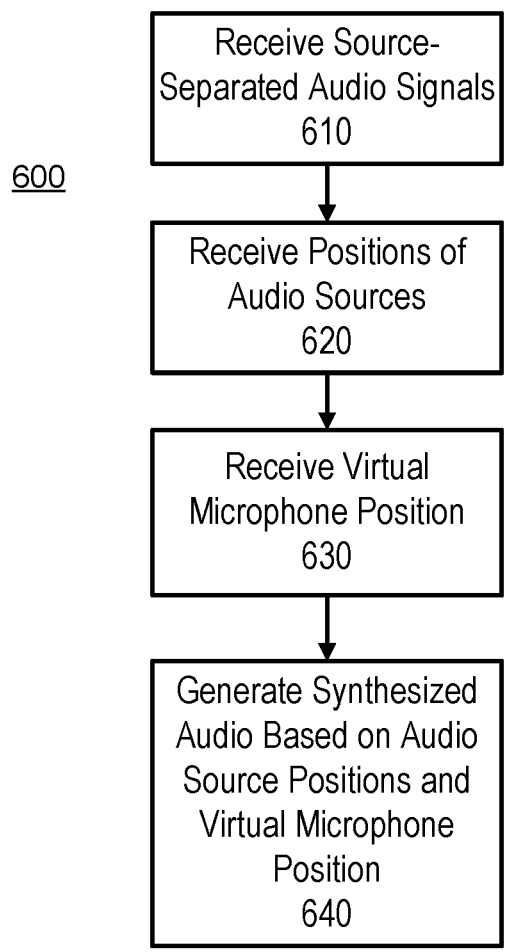
FIG. 6 illustrates a flowchart of a process for generating synthesized audio for a virtual microphone.

FIG. 6 illustrates a flowchart of a process 600 that may be performed by the virtual microphone module 500 for generating synthesized audio for a virtual microphone.

The virtual microphone module 500 may receive 610 a set of source-separated audio signals. The virtual microphone module 500 also may receive 620 positions of the audio sources from which the source-separated audio signals originated. These positions may be time-varying and may be from a spatial audio scene generated by a spatial audio scene module 200.

The virtual microphone module 500 receives 630 a virtual microphone position. The virtual microphone position may be specified by a user of a user device that includes the virtual microphone module 630. The user may also specify an orientation and a polar pattern for the virtual microphone. The audio synthesization module 530 may generate 640 synthesized audio based on the audio source positions and the virtual microphone position. The synthesized audio may simulate the sound that would have been captured by a microphone if it was present at the desired microphone position during recording of the spatial audio scene. The synthesized audio may be played to a user.

In an embodiment, the user may move the virtual microphone location over time. At each time instant, the audio synthesization module 530 may construct the audio signal that would have been captured by a microphone at that time-varying location given the current positions of the audio sources. Thus, the user may move the virtual microphone within the volume to simulate moving a real microphone in a volume with multiple audio sources at time-varying positions.

Furthermore, in an embodiment, the positions of the audio sources 620 may be based on identified positions within one or more videos or within a volumetric video synthesized from multiple cameras. In these cases, the time-varying positions may be obtained by visually tracking objects corresponding to the audio sources, as described above. At each instant in the audio, the audio synthesization module 530 may construct the audio signal that would have been captured by a microphone given the current tracked positions of the audio sources.

Example Camera Architecture

Figure 7:
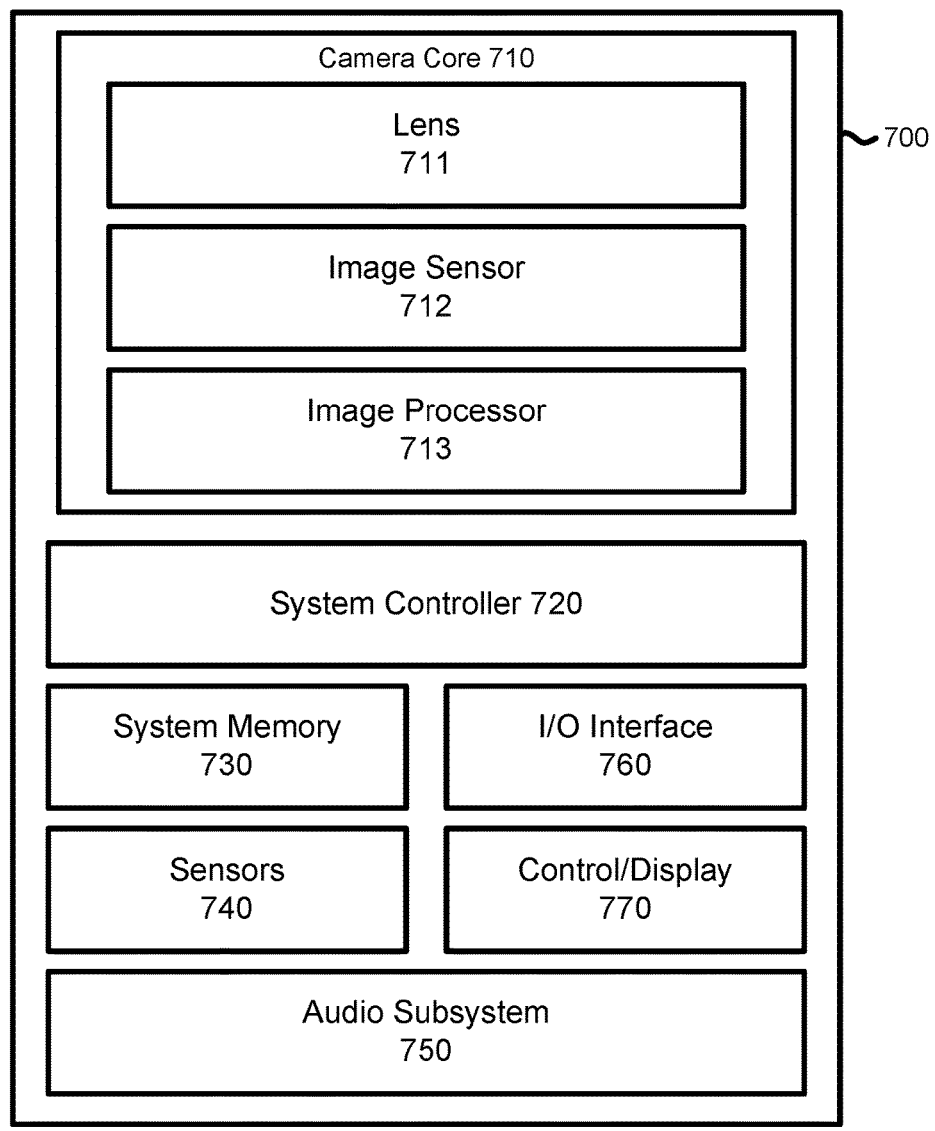
FIG. 7 illustrates a block diagram of an example camera.

FIG. 7 illustrates a block diagram of the architecture of an example camera 700. The camera 700 may be, for example, a camera with directional microphone 112A. The camera 700 may include a camera core 710, a system controller 720, a system memory 730, sensors 740, an audio subsystem 750, an I/O interface 760, a control/display subsystem 770. The camera core includes a lens 711, an image sensor 712, and an image processor 713.

As described in greater detail below, the camera 700 may include sensors 740 to capture metadata associated with video data, such as timing data, motion data, speed data, acceleration data, altitude data, GPS data, and the like. In a particular embodiment, location and/or time centric metadata (geographic location, time, speed, etc.) may be incorporated into a media file together with the captured content in order to track the position of the camera 700 over time. This metadata may be captured by the camera 700 itself or by another device (e.g., a mobile phone or device connected to the camera 700) proximate to the camera 700. In one embodiment, the metadata may be incorporated with the content stream by the camera 700 as the content is being captured. In another embodiment, a metadata file separate from the video file may be captured (by the same capture device or a different capture device) and the two separate files may be combined or otherwise processed together in post-processing.

In the embodiment illustrated in FIG. 7, the camera 700 may include a camera core 710 that includes a lens 712, an image sensor 714, and an image processor 716. The camera 700 may additionally include a system controller 720 (e.g., a microcontroller or microprocessor) that controls the operation and functionality of the camera 700 and system memory 730 configured to store executable computer instructions that, when executed by the system controller 720 and/or the image processors 716, perform the camera functionalities described herein. In some embodiments, a camera 700 may include multiple camera cores 710 to capture fields of view in different directions which may then be stitched together to form a cohesive image.

The lens 712 may be, for example, a wide angle lens, hemispherical, or hyper hemispherical lens that focuses light entering the lens to the image sensor 414 which captures images and/or video frames. The image sensor 714 may capture high-definition images having a resolution of, for example, 620p, 1080p, 4k, or higher. For video, the image sensor 714 may capture video at frame rates of, for example, 30 frames per second, 60 frames per second, or higher. The image processor 716 may perform one or more image processing functions of the captured images or video. For example, the image processor 716 may perform a Bayer transformation, demosaicing, noise reduction, image sharpening, image stabilization, rolling shutter artifact reduction, color space conversion, compression, or other in-camera processing functions. Processed images and video may be temporarily or persistently stored to system memory 730 and/or to a non-volatile storage, which may be in the form of internal storage or an external memory card.

An input/output (I/O) interface 760 may transmit and receive data from various external devices. For example, the I/O interface 760 may facilitate the receiving or transmitting video or audio information through an I/O port. Examples of I/O ports or interfaces include USB ports, HDMI ports, Ethernet ports, audio ports, and the like. Furthermore, embodiments of the I/O interface 760 may include wireless ports that can accommodate wireless connections. Examples of wireless ports include Bluetooth, Wireless USB, Near Field Communication (NFC), and the like. The I/O interface 760 may also include an interface to synchronize the camera 700 with other cameras or with other external devices, such as a remote control, a second camera, a smartphone, a client device, or a video server. In some embodiments, multiple cameras may be communicatively coupled. The cameras (e.g., cameras corresponding to microphones 112) may communicate through one or more radio protocols, such as, Wi-Fi, Bluetooth, third generation mobile telecommunications technology (3G), or fourth generation mobile telecommunications technology (e.g., Mobile WiMAX or LTE).

In some embodiments, I/O interfaces 760 in a plurality of commutatively coupled cameras 700 may automatically detect the relative delays of radio signals transmitted between the cameras. These signals may be pseudonoise sequences, such as Gold codes, or packets that include time stamps. The cameras 700 may determine the distances between each other based on the time of flight delay of these signals and internal clocks in the cameras (e.g., clocks synchronized with GPS). The distances between each camera 700 may be used to determine the relative positions of the cameras. In some embodiments, the cameras 700 transmit ultrasound signals which are detected by the other cameras to determine the relative positions of the cameras 700.

A control/display subsystem 770 may include various control and display components associated with operation of the camera 700 including, for example, LED lights, a display, buttons, microphones, speakers, and the like. The audio subsystem 750 may include, for example, one or more microphones and one or more audio processors to capture and process audio data correlated with video capture. In one embodiment, the audio subsystem 750 may include a single integrated microphone. In another embodiment, the audio subsystem 750 may include a microphone array having two or more microphones arranged to obtain directional audio signals. Alternatively, two or more microphones may be used and various beamforming techniques may be applied to generate a plurality of audio signals, each corresponding to a different direction. In this case, there is not necessarily a one-to-one correspondence between a microphone and an audio signal. Rather, audio from multiple microphones may be weighted and combined to contribute to a single audio signal or audio data corresponding to a particular direction may be interpolated based on microphones oriented in different directions.

Sensors 740 may capture various metadata concurrently with, or separately from, video capture. For example, the sensors 740 may capture time-stamped location information based on a global positioning system (GPS) sensor, and/or an altimeter. Other sensors 740 may be used to detect and capture orientation of the camera 700 including, for example, an orientation sensor, an accelerometer, a gyroscope, or a magnetometer. Some combination of accelerometers, gyroscopes, and magnetometers may be used to perform dead reckoning. Sensor data captured from the various sensors 740 may be processed to generate other types of metadata. For example, sensor data from the accelerometer may be used to generate motion metadata, which may include velocity and/or acceleration vectors representative of motion of the camera 700. Sensor data from a GPS sensor may provide GPS coordinates identifying the location of the camera 700, and the altimeter may measure the altitude of the camera 700. In one embodiment, the sensors 740 may be rigidly coupled to the camera 700 such that any motion, orientation, or change in location experienced by the camera 700 is also experienced by the sensors 740. The sensors 740 may also associates a time stamp representing when the data was captured by each sensor. In one embodiment, the sensors 740 may automatically begin collecting sensor metadata when the camera 700 begins recording a video.

A set of communicatively coupled cameras (e.g., a plurality of cameras each including one of the directional microphones 112) may determine their relative positions based a combination of absolute position detection (e.g., GPS, altimeters, or dead reckoning) and relative position detection (e.g., based on the signal propagation delays detected by the I/O interface 760). A combination of one or magnetometers and gyroscopes may be used to estimate relative orientations for the cameras.

Additional Considerations

The disclosed configuration describes a system and method for generating a model of the geometric relationships between various audio sources recorded by a multi-camera system. The spatial audio scene module may associate source signals, extracted from recorded audio, of audio sources to visual objects recorded by one or more cameras. The estimated positions of the audio sources may be tracked indirectly by tracking associated visual objects with computer vision. A virtual microphone module may then receive a position for a virtual microphone and synthesizes a signal corresponding to the virtual microphone position based on the estimated positions of the audio sources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

In this specification, mathematical notation is used to describe certain objects, operators, functions, relationships between objects, and the like. When applicable, these mathematical objects and functions may be implemented in a computer (e.g., via floating point operations). Some mathematical objects and operators described in terms of continuous functions may be implemented with discrete data structures and operators. For example, a continuous function (e.g., $x(t)$) may be implemented as a finite array $x[n]$ and the integration operator (e.g., $\int x(t)dt$) may be implemented as a finite summation $\Sigma x[n]$. Additionally, the functions and algorithms described in this specification may be implemented as approximations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for the disclosed systems and methods. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for locating and tracking one or more audio sources recorded by a set of microphones, the set of microphones including a first microphone and a second microphone, the method comprising:
  receiving position information for a camera;
  receiving position information for individual ones of the microphones in the set of microphones;
  receiving a video recorded by the camera, the video including a first visual object and a second visual object, the first visual object being a first audio source and the second visual object being a second audio source;
  receiving audio signals recorded by the microphones, the audio signals including a first audio signal recorded by the first microphone and a second audio signal recorded by the second microphone, individual ones of the audio signals including sounds generated by the first audio source and the second audio source, wherein the first audio signal includes a first audio component corresponding to the sounds generated by the first audio source and a second audio component corresponding to the sounds generated by the second audio source, and the second audio signal includes a third audio component corresponding to the sounds generated by the first audio source and a fourth audio component corresponding to the sounds generated by the second audio source;
  applying source separation to the audio signals to generate individual audio source signals for the sounds generated by individual audio sources, the audio source signals including a first audio source signal and a second audio source signal, the first audio source signal including the sounds generated by the first audio source and the second audio source signal including the sounds generated by the second audio source, wherein the first audio source signal is generated by combining the first audio component and the third audio component; and the second audio source signal is generated by combining the second audio component and the fourth audio component;
  estimating positions of the first audio source and the second audio source based on the position information for the microphones;
  estimating positions of the first visual object and the second visual object based on a visual analysis of the video and the position information for the camera;
  matching the individual audio sources to corresponding visual objects based on the estimated positions of the audio sources and the estimated positions of the visual objects such that the first audio source is matched to the first visual object and the second audio source is matched to the second visual object;
  tracking movement of the visual objects to generate visual object position data associated with movement of the visual objects; and
  storing audio source position data for the individual audio source signals based on the visual object position data associated with the visual object to which the respective audio source was matched.

2. The method of claim 1, wherein estimating the position of the first audio source comprises:
  determining an estimated signal gain of the first audio signal, the signal gain indicating a magnitude of a component of the first audio signal.

3. The method of claim 2, wherein estimating the position of the first audio source is based on:
  the estimated signal gain of the first audio signal;
  the orientation of the first microphone that recorded the first audio signal; and
  a model of a directional gain for the first microphone.

4. The method of claim 1, wherein estimating the position of the first audio source comprises:
  determining an estimated delay of the first audio signal, the delay indicating a time offset of a component of the first audio signal.

5. The method of claim 1, wherein the microphones are directional microphones.

6. The method of claim 1, wherein the individual ones of the microphones are integrated in a respective camera.

7. A non-transitory computer readable medium storing instructions for locating and tracking one or more audio sources recorded by a set of microphones, the set of microphones including a first microphone and a second microphone, wherein the instructions when executed by one or more computer processors cause the one or more processors to perform steps comprising:
  receiving position information for a camera;
  receiving position information for individual ones of the microphones in the set of microphones;
  receiving a video recorded by the camera, the video including a first visual object and a second visual object, the first visual object being a first audio source and the second visual object being a second audio source;
  receiving audio signals recorded by the microphones, the audio signals including a first audio signal recorded by the first microphone and a second audio signal recorded by the second microphone, individual ones of the audio signals including sounds generated by the first audio source and the second audio source, wherein the first audio signal includes a first audio component corresponding to the sounds generated by the first audio source and a second audio component corresponding to the sounds generated by the second audio source, and the second audio signal includes a third audio component corresponding to the sounds generated by the first audio source and a fourth audio component corresponding to the sounds generated by the second audio source;
  applying source separation to the signals to generate individual audio source signals for the sounds generated by individual audio sources, the audio source signals including a first audio source signal and a second audio source signal, the first audio source signal including the sounds generated by the first audio source and the second audio source signal including the sounds generated by the second audio source, wherein the first audio source signal is generated by combining the first audio component and the third audio component; and the second audio source signal is generated by combining the second audio component and the fourth audio component;
  estimating positions of the first audio source and the second audio source based on the position information for the microphones;
  estimating positions of the first visual object and the second visual object based on a visual analysis of the video and the position information for the camera;
  matching the individual audio sources to corresponding visual objects based on the estimated positions of the audio sources and the estimated positions of the visual objects such that the first audio source is matched to the first visual object and the second audio source is matched to the second visual object;
  tracking movement of each of the visual objects to generate visual object position data associated with movement of the visual objects; and storing audio source position data for the individual audio source signals based on the visual object position data associated with the visual object to which the respective audio source was matched.

8. The non-transitory computer readable medium of claim 7, wherein estimating the position of the first audio source comprises:
determining an estimated signal gain of the first audio signal, the signal gain indicating a magnitude of a component of the first audio signal.

9. The non-transitory computer readable medium of claim 8, wherein estimating the position of the first audio source is based on:
the estimated signal gain of the first audio signal; and
a model of a directional gain for the first microphone that recorded the first audio signal.

10. The non-transitory computer readable medium of claim 7, wherein estimating the position of the first audio source comprises:
determining an estimated delay of the first audio signal, the delay indicating a time offset of a component of the first audio signal.

11. The non-transitory computer readable medium of claim 7, wherein the individual ones of the microphones are integrated in a respective camera.

12. A method for locating and tracking one or more audio sources recorded by a set of microphones, the set of microphones including a first microphone and a second microphone, the method comprising:
receiving position information for a camera;
receiving position information for individual ones of the microphones in the set of microphones;
receiving a video recorded by the camera, the video including a first visual object and a second visual object, the first visual object being a first audio source and the second visual object being a second audio source;
receiving audio signals recorded by the microphones, the audio signals including a first audio signal recorded by the first microphone and a second audio signal recorded by the second microphone, individual ones of the audio signals including sounds generated by the first audio source and the second audio source, wherein the first audio signal includes a first audio component corresponding to the sounds generated by the first audio source and a second audio component corresponding to the sounds generated by the second audio source, and the second audio signal includes a third audio component corresponding to the sounds generated by the first audio source and a fourth audio component corresponding to the sounds generated by the second audio source;
estimating positions of the first visual object and the second visual object based on a visual analysis of the video corresponding to a first time in the video and the position information for the camera;
applying source separation to the audio signals to generate individual audio source signals for the sounds generated by individual audio sources, the audio source signals including a first audio source signal and a second audio source signal, the first audio source signal including the sounds generated by the first audio source and the second audio source signal including the sounds generated by the second audio source, wherein the first audio source signal is generated by combining the first audio component and the third audio component; and the second audio source signal is generated by combining the second audio component and the fourth audio component;
estimating positions of the first audio source and the second audio source corresponding to the first time based on the position information for the microphones;
matching the individual audio sources to corresponding visual objects based on the estimated positions of the audio sources and the estimated positions of the visual objects such that the first audio source is matched to the first visual object and the second audio source is matched to the second visual object; and
tracking the positions of the individual audio sources by tracking the visual objects to which the audio sources are matched.

13. The method of claim 12, wherein estimating the position of the first audio source comprises:
determining an estimated signal gain of the first audio signal, the signal gain indicating a magnitude of a component of the first audio signal; and
estimating the position of the first audio source based on the signal gain of the first audio signal.

14. The method of claim 1, wherein:
the first audio signal includes a first audio component corresponding to the sounds generated by the first audio source and a second audio component corresponding to the sounds generated by the second audio source; and
the first audio source signal is generated by suppressing the second audio component of the first audio signal.

15. The method of claim 1, applying source separation to the audio signals to generate the individual audio source signals for the sounds generated by the individual audio sources includes:
identifying a given class of the first visual object, the given class associated with particular sounds or particular forms of sounds; and
separating the audio signals based on the given class of the first visual object.

16. The method of claim 15, wherein the given class of the first visual object is identified or the audio signals are separated based on the given class of the first visual object using a machine learning model, the machine learning model trained with audio training data that is cataloged or annotated based on types of audio sources.

17. The method of claim 1, wherein the source separation is applied based on source information about the audio sources, the source information identifying a number of expected audio source signals.

18. The method of claim 17, wherein the source information further identifies audio characteristics of the sounds generated by the audio sources.

19. The method of claim 18, wherein the source information is selected based on visual cues in the video associated with the audio sources.

* * * * *